United States Patent
Ali et al.

(10) Patent No.: US 11,431,665 B1
(45) Date of Patent: Aug. 30, 2022

(54) DYNAMICALLY CONTROLLED PERMISSIONS FOR MANAGING THE COMMUNICATION OF MESSAGES DIRECTED TO A PRESENTER

(71) Applicant: MICROSOFT TECHNOLOGY LICENSING, LLC, Redmond, WA (US)

(72) Inventors: Bahram Ali, Bellevue, WA (US); Fehmi Chebil, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/191,476

(22) Filed: Mar. 3, 2021

(51) Int. Cl.
*G06F 15/16* (2006.01)
*H04L 51/212* (2022.01)
*H04L 12/18* (2006.01)
*H04L 51/226* (2022.01)

(52) U.S. Cl.
CPC ........ *H04L 51/212* (2022.05); *H04L 12/1822* (2013.01); *H04L 51/226* (2022.05)

(58) Field of Classification Search
CPC ...... H04L 51/12; H04L 51/26; H04L 12/1822
USPC ........................................................ 709/206
See application file for complete search history.

(56) References Cited

U.S. PATENT DOCUMENTS

| | | | | |
|---|---|---|---|---|
| 5,623,603 A * | 4/1997 | Jiang | .................. | H04L 65/4038 710/52 |
| 7,058,891 B2 * | 6/2006 | O'Neal | .................... | G09B 5/00 715/740 |
| 7,124,164 B1 * | 10/2006 | Chemtob | ............... | G06Q 10/10 709/204 |
| 7,124,372 B2 * | 10/2006 | Brin | .................... | H04L 12/1822 715/757 |

(Continued)

FOREIGN PATENT DOCUMENTS

WO WO-2020191090 A1 * 9/2020

OTHER PUBLICATIONS

"BigBlueButton (Web Conferencing)", https://carieton.ca/culearnsupport/instructors/bigbluebutton/, Aug. 4, 2020, 76 Pages.

(Continued)

*Primary Examiner* — Alicia Baturay
(74) *Attorney, Agent, or Firm* — Scott Y. Shigeta; Newport IP, LLC

(57) ABSTRACT

The techniques disclosed herein provide dynamic permissions for controlling messages directed to a presenter of a communication system. For example, during a presentation of an online meeting, a system may selectively permit private messages to be sent to a presenter from designated participants. The private messages sent from the designated participants are displayed to the presenter in a manner that does not allow the other participants to see the messages. For instance, if the presenter is sharing a screen from a computer, the system can determine a set of permitted users allowed to send messages to the presenter. The system configures (Continued)

permissions to cause the messages to be displayed in a manner that allows the presenter to view the messages along with their presentation content, while restricting or suppressing the display of the messages to other non-permitted users. The system restricts the non-permitted users from sending messages to the presenter.

20 Claims, 21 Drawing Sheets

(56) References Cited

U.S. PATENT DOCUMENTS

| | | | |
|---|---|---|---|
| 7,418,476 B2 | 8/2008 | Salesky et al. | |
| 7,751,347 B2* | 7/2010 | Giroti | H04L 12/1822 370/260 |
| 7,907,060 B2* | 3/2011 | Reams | H04N 21/42204 324/426 |
| 8,300,557 B2* | 10/2012 | Sekaran | H04L 12/1822 370/260 |
| 8,411,130 B2* | 4/2013 | Lee | H04N 7/15 348/14.07 |
| 8,797,900 B2* | 8/2014 | Jaiswal | H04L 12/1827 370/252 |
| 8,903,933 B1* | 12/2014 | Bellini, III | H04L 67/322 709/224 |
| 9,064,232 B2* | 6/2015 | Laine | G09B 5/065 |
| 9,241,062 B2* | 1/2016 | Khalid | H04M 1/72409 |
| 9,344,396 B2* | 5/2016 | Geppert | H04M 1/27475 |
| 9,401,937 B1* | 7/2016 | Gottlieb | G06V 40/20 |
| 9,544,257 B2* | 1/2017 | Ogundokun | H04L 51/04 |
| 9,800,831 B2* | 10/2017 | Diao | H04N 7/157 |
| 9,870,755 B2* | 1/2018 | Chen | H04N 7/15 |
| 9,942,519 B1* | 4/2018 | Pan | H04N 21/47 |
| 9,990,770 B2* | 6/2018 | Anderson | H04W 4/024 |
| 10,110,645 B2* | 10/2018 | Bader-Natal | G06F 3/04842 |
| 10,134,364 B2* | 11/2018 | Chen | G09G 5/005 |
| 10,171,386 B1* | 1/2019 | Pendap | H04L 51/14 |
| 10,218,657 B2* | 2/2019 | Cheung | H04L 51/04 |
| 10,382,498 B2* | 8/2019 | Xi | H04L 65/4038 |
| 10,466,777 B2 | 11/2019 | Liu | |
| 10,505,998 B1 | 12/2019 | Ackerman et al. | |
| 10,547,575 B2* | 1/2020 | Cohen | H04L 51/046 |
| 10,632,372 B2* | 4/2020 | Gilmore | A63F 13/40 |
| 10,666,696 B2* | 5/2020 | Bader-Natal | H04N 7/148 |
| 10,789,576 B2* | 9/2020 | Bellamy | G06Q 10/1095 |
| 10,805,365 B2* | 10/2020 | Bader-Natal | G06Q 10/101 |
| 10,863,230 B1* | 12/2020 | Pham | H04N 21/6547 |
| 10,917,608 B1* | 2/2021 | Faulkner | G06V 20/41 |
| 11,082,661 B1* | 8/2021 | Pollefeys | H04N 7/152 |
| 11,113,983 B1* | 9/2021 | Fieldman | G09B 5/065 |
| 11,115,444 B2* | 9/2021 | Katekar | H04L 12/1822 |
| 2002/0129112 A1* | 9/2002 | Maehiro | H04L 12/1822 348/E7.078 |
| 2004/0148356 A1* | 7/2004 | Bishop, Jr. | H04L 51/38 709/206 |
| 2005/0091578 A1* | 4/2005 | Madan | G06F 40/169 715/201 |
| 2005/0243819 A1* | 11/2005 | Peng | H04L 65/1069 370/389 |
| 2006/0095864 A1* | 5/2006 | Mock | G06F 3/016 715/810 |
| 2008/0059580 A1* | 3/2008 | Kalinowski | G06Q 10/107 709/204 |
| 2008/0059986 A1* | 3/2008 | Kalinowski | H04N 21/2743 725/112 |
| 2010/0005402 A1 | 1/2010 | George et al. | |
| 2010/0037151 A1 | 2/2010 | Ackerman et al. | |
| 2010/0060789 A1* | 3/2010 | Aoki | G09G 5/14 725/33 |
| 2010/0062840 A1* | 3/2010 | Herrmann | G07F 17/3237 463/43 |
| 2010/0253689 A1* | 10/2010 | Dinicola | H04M 3/567 382/190 |
| 2010/0293511 A1* | 11/2010 | Agnetta | G09G 5/003 715/864 |
| 2012/0017149 A1* | 1/2012 | Lai | H04L 65/403 715/758 |
| 2012/0204120 A1* | 8/2012 | Lefar | G06Q 10/0631 715/757 |
| 2013/0222225 A1* | 8/2013 | Eriksson | G06F 16/4393 345/156 |
| 2014/0032670 A1 | 1/2014 | Ellingson et al. | |
| 2014/0108962 A1* | 4/2014 | Olomskiy | G06Q 50/01 715/753 |
| 2014/0229866 A1* | 8/2014 | Gottlieb | G06F 3/0486 709/204 |
| 2014/0331265 A1* | 11/2014 | Mozell | H04N 21/254 725/93 |
| 2015/0033148 A1 | 1/2015 | Kuchoor | |
| 2016/0133095 A1* | 5/2016 | Shraibman | G06Q 50/01 463/18 |
| 2016/0344567 A1* | 11/2016 | Navale | H04L 65/4038 |
| 2017/0351476 A1* | 12/2017 | Yoakum | G06F 3/0484 |
| 2021/0400142 A1* | 12/2021 | Jorasch | H04L 65/1069 |

OTHER PUBLICATIONS

"How to use the Chat Pod in Adobe Connect", Retrieved from: https://ecampus.fiu.edu/documents/AdobeConnect/How%20to%20use%20the%20Chat%20Pod%20in%20Adobe%20Connect.pdf, Retrieved Date: Dec. 3, 2020, 6 Pages.

"Managing WebEx Meetings", Retrieved from: https://web.archive.org/web/20201101003534/https:/www.cisco.com/c/en/us/td/docs/collaboration/CWMS/2_5/b_manage_meetings/b_manage_meetings_chapter_01.html, Nov. 1, 2020, 2 Pages.

"International Search Report and Written Opinion Issued in PCT Application No. PCT/US22/017408", dated May 6, 2022, 10 Pages.

* cited by examiner

DYNAMICALLY CONTROLLED PERMISSIONS FOR MANAGING THE COMMUNICATION OF MESSAGES DIRECTED TO A PRESENTER

BACKGROUND

There are a number of different communication systems that allow users to collaborate. For example, some systems allow people to collaborate by sharing live video streams, live audio streams, and other forms of text or image-based mediums. Participants of a communication session can share a video stream showing a single person or a group of people with a display of shared content. Such systems are designed to provide participants of a communication session with an experience that simulates an in-person meeting.

Although there are a number of different types of systems that are designed to simulate an in-person meeting, such systems still have a number of shortcomings. For example, some communication systems provide a simplified, rigid set of permission settings that do not provide a granular level of control for allowing users to access particular sets of functions or particular sets of data. Some systems only offer all-or-nothing user permissions for controlling the flow of private messages between each participant of an online meeting. Such limitations do not allow communication systems to readily accommodate a number of user scenarios. In one illustrative example, a system may offer permission settings that either allow users to share private chat messages or restrict the use of private chat messages. In a scenario where an online meeting involves participants from two different companies, participants from one company may want to share private chat messages with each other but restrict the communication of private messages from participants of another company. Further, participants from one company may only want to restrict the communication of private messages only during a portion of a meeting, e.g., during a presentation of a particular person. Existing systems cannot accommodate the needs that may arise in such scenarios.

To accommodate some specific user scenarios, system administrators may be able to modify specific settings for certain users. Although this may accommodate some use scenarios, e.g., allow users to have different communication permissions, these existing systems require users to take a number of manual steps to make these changes. Not only are these requirements inefficient and expensive with respect to administrative overhead, but these system paradigms also create a number of security issues. By requiring users to make manual changes to permissions, human error and communication issues can come into play, thus creating room for errant permission settings that can expose a system to threatening attack vectors. In view of such scenarios, and other scenarios, there is an ongoing need to improve the flexibility and agility of existing systems with regard to the control of user permissions. There is also an ongoing need to improve a system's ability to provide a granular level of control of permissions to accommodate specific use scenarios while also mitigating a system's exposure to human error and potential attack vectors.

SUMMARY

The techniques disclosed herein provide dynamically controlled permissions for managing the communication and display of messages directed to a presenter of a communication system. For example, during a presentation of an online meeting, a system may selectively allow permitted users to send private messages to a presenter. The private messages sent from the permitted users are displayed to the presenter in a manner that does not allow the other participants to see the messages. For instance, if the presenter is sharing content, such as a slide deck, video content, or a shared desktop, the system can display the messages as a semi-transparent overlay on the shared content. The messages are displayed in a manner that allows the presenter to view the messages contemporaneously with their shared content while restricting or suppressing the display of the messages to other users, such as the non-permitted users. In addition, the system can configure permissions to restrict the non-permitted users from sending messages to the presenter. The permitted users and the non-permitted users can be determined by a number of different factors, including but not limited to a domain associated with the users, a role of the users, a location of the users, or by a selection indicated by an authorized user, such as the presenter.

In some embodiments, a virtual meeting system allows a presenter to designate specific permitted attendees. The presenter can indicate specific individuals, which may be meeting attendees or other users, or the presenter can establish a policy defining characteristics, e.g., email domains, that can be used to identify groups of permitted users. The system can allow the permitted users to tunnel through a system and send messages that are displayed to a presenter who is actively giving a presentation or performing another predetermined role. The system can display a private message during a presentation. In one example, the messages are displayed by overlaying the messages on a presentation screen on the presenter's display device such that only the presenter can see the messages. The pixels of overlaid messages are transmitted to the presenter only. The virtual meeting system does not include the pixels of the messages into the presentation video streams transmitted to other attendees of the meeting.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
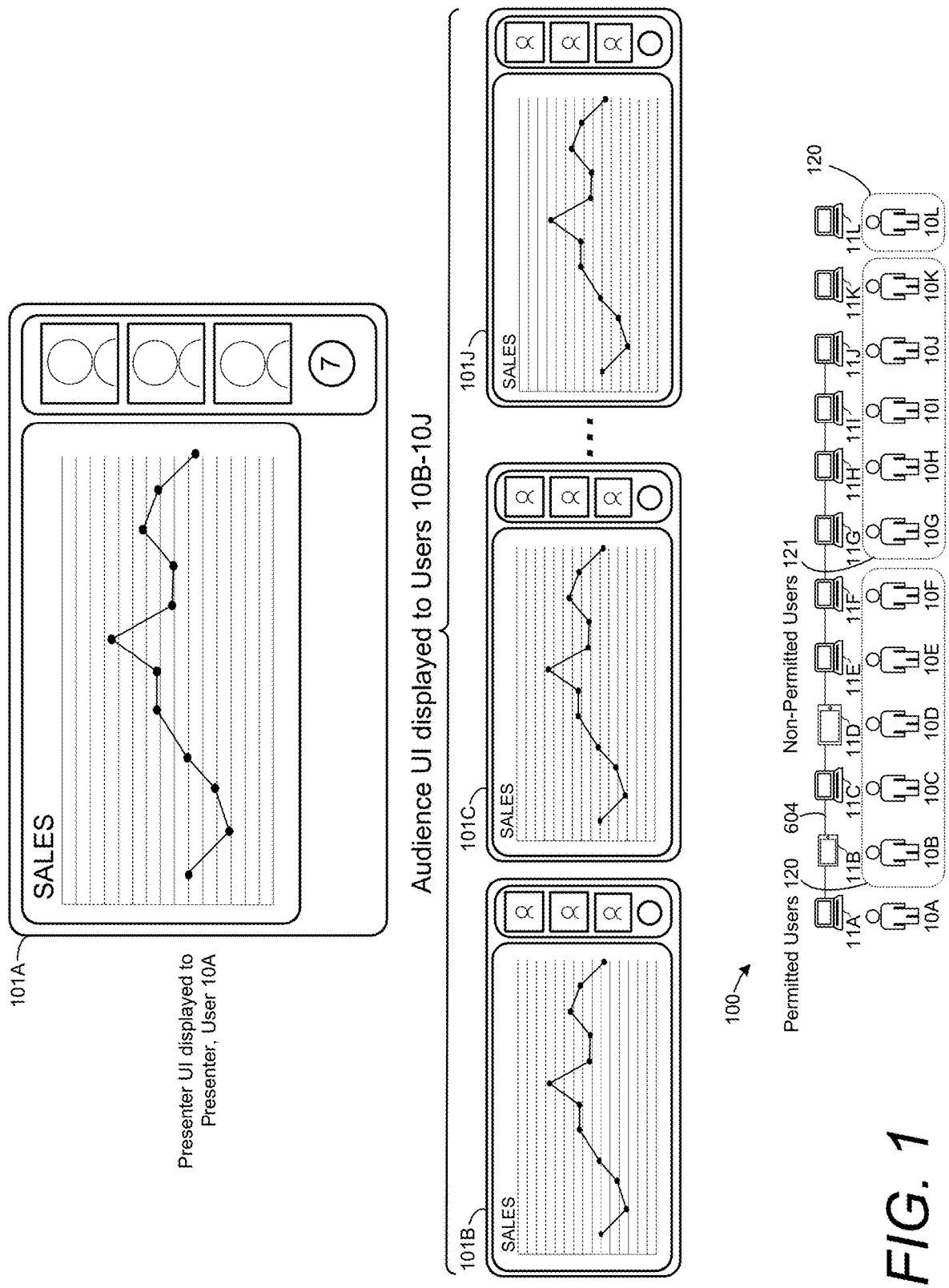
FIG. 1 is a block diagram of a system and example user interfaces for providing dynamically controlled permissions for the communication of messages directed to a presenter.

The techniques disclosed herein allow a system to control user permissions at a granular level for enabling the system to adapt to particular use scenarios. Unlike some existing systems, which can require administrators or users to manually configure all-or-nothing permissions, the system disclosed herein can produce a number of technical effects involving a computationally efficient process for managing permissions based on roles, activities, or related domains of certain users. Among some technical effects, this automation improves the security of the system by mitigating the need for manual steps for configuring permissions and thus mitigating unintended permissions that may be caused by human error. This automation also improves a system by providing a more granular level of control of permissions for select content and specific users, and the permissions can change dynamically as a system detects the presence of specific user scenarios. This automation also improves the efficiency of a system by allowing meetings or collaborative events to have a continuous flow without interruptions that may be needed for permissions to be configured for certain user scenarios. Permissions can be configured and reconfigured multiple times in an event to allow select users to communicate messages to a person having a specific role during a particular portion or stage of an event. For instance, as a meeting transitions to different presenters, the system can roll through various sets of permissions to only let the right people send messages to each presenter. Once an event or an event stage is complete, and/or if the role changes for that selected person, the permissions can be automatically modified to allow another group or the same group of participants to communicate exclusively to another user. This autonomous flow of permission transitions can improve a system's level of security by controlling content and message flow based on the needs of a particular meeting type or roles in a meeting.

The system for controlling the communication of messages to a particular person during a specific portion of an event can also provide a number of other benefits other than added security and process flow. For instance, reducing the need for human interaction, or improving human interaction with the computer, a system can mitigate user fatigue and promote user engagement. To that end, participants of a communication session are less likely to miss salient information and reduce the need for users to refer to recordings, alternative communication methods, or prolong meetings, all of which can lead to inefficient use of computing resources. The benefits of the techniques disclosed herein can also mitigate the need for redundant use of network, processor, memory, or other computing resources.

These technical benefits can also reduce the likelihood of inadvertent user inputs and other errors that may result when a user has to attend to user permissions and thus may miss salient information during a meeting. When users are distracted from an online event, they are required to review recordings or communicate with others when salient information is missed. When a participant of a video conference misses salient information due to a lack of user engagement, a system may be required to retrieve, communicate, and process multiple copies of information.

Referring now to FIG. 1, aspects of a system 100 are shown and described below. In some configurations, the system 100 can comprise a plurality of computing devices 11A-11L respectively associated with a number of users 10A-10L. Some of the computing devices 11A-11J can be configured to communicate through a network to be interconnected using a communication session 604. The communication session 604 may be in the form of a meeting, a multi-user collaboration session, a video broadcast, etc. As described in more detail below, a communication session can be facilitated by a remote server or the communication session can be facilitated by any of the computing devices 11A-11J utilizing a peer-to-peer configuration. Live and recorded video streams can be shared over a communication session 604 along with additional content, such as word documents, slide decks, shared desktops, chat messages, application interfaces, videos, and images.

Each computing device 11 can generate a user interface 101 each displaying shared content along with live video stream thumbnails or still image thumbnails of each participant. The thumbnails may be arranged according to various factors, including the most active speaker, a current presenter, etc. Other graphical elements can indicate a number of participants of a meeting. In the scenario shown in FIG. 1, a first user 10A is operating a first computing device 11A, and is in a role as a presenter, who is controlling content, e.g., the SALES line graph, to be shared with a number of participants 10B-10J of a communication session 604. A subset of the computing devices, such as the eleventh computing device 11K and the twelfth computing device 11L, are not participating in the communication session, e.g., these users 10K and 10L are not part of the meeting, but these respective devices may be able to communicate to the other computing devices 10A-10J by sending private chat messages, emails, etc.

Input data indicating a selection of permitted users 10B-10F and 10L from the number of users 10A-10L can be received by one of the devices 11A-11L or by a remote server. The input data can identify permitted users 10B-10F and 10L, also referred to herein as permitted users 120, who are allowed to communicate messages to a particular user, such as the first user 10A. This may occur in the scenario, for example, where the first user 10A is a presenter of the meeting or otherwise holds a predetermined role such as a director, coordinator, or a preferred audience member. The first user 10A can provide input data to identify the permitted users. In addition, other input data, such as a directory of email addresses or other identifiers can be used to identify the permitted users. The permitted users 120 can be, for example, on the same team, company, or entity as the first user 10A. In one specific example, permitted users can include users that are associated with an email address having the same domain as a presenter of a meeting. Other input data indicating characteristics associated with the first user can also be utilized to select the permitted users. For instance, any user that have a common location or share a role with the first user may be selected as a permitted user.

The input data can also identify other users 10G-10K of the number of users 10A-10L, also referred to herein as non-permitted users 121 or restricted users, who are to be restricted from communicating messages to the first user 10A. The non-permitted users may include people who are not on the same team, company or entity as the first user 10A. Referencing the above example, non-permitted users can include users that are associated with an email address that does not have the same domain as the presenter. Non-permitted users can also be automatically designated based on other criteria, e.g., if those users are not on the same team, not at the same location, or do not have common characteristics with the presenter.

In response to the input data, the system can configure permission data for allowing the permitted users 10B-10F and 10L, also referred to herein as "permitted users 120," to exclusively communicate individual messages to a computing device 11A associated with a predetermined user, such as the first user 10A, who may be designated as a presenter for at least a portion of an event. The system may also configure the permission data to restrict the other users 10G-10K of the number of users 10A-10L from communicating messages to the presenter during the presentation.

Figure 2A:
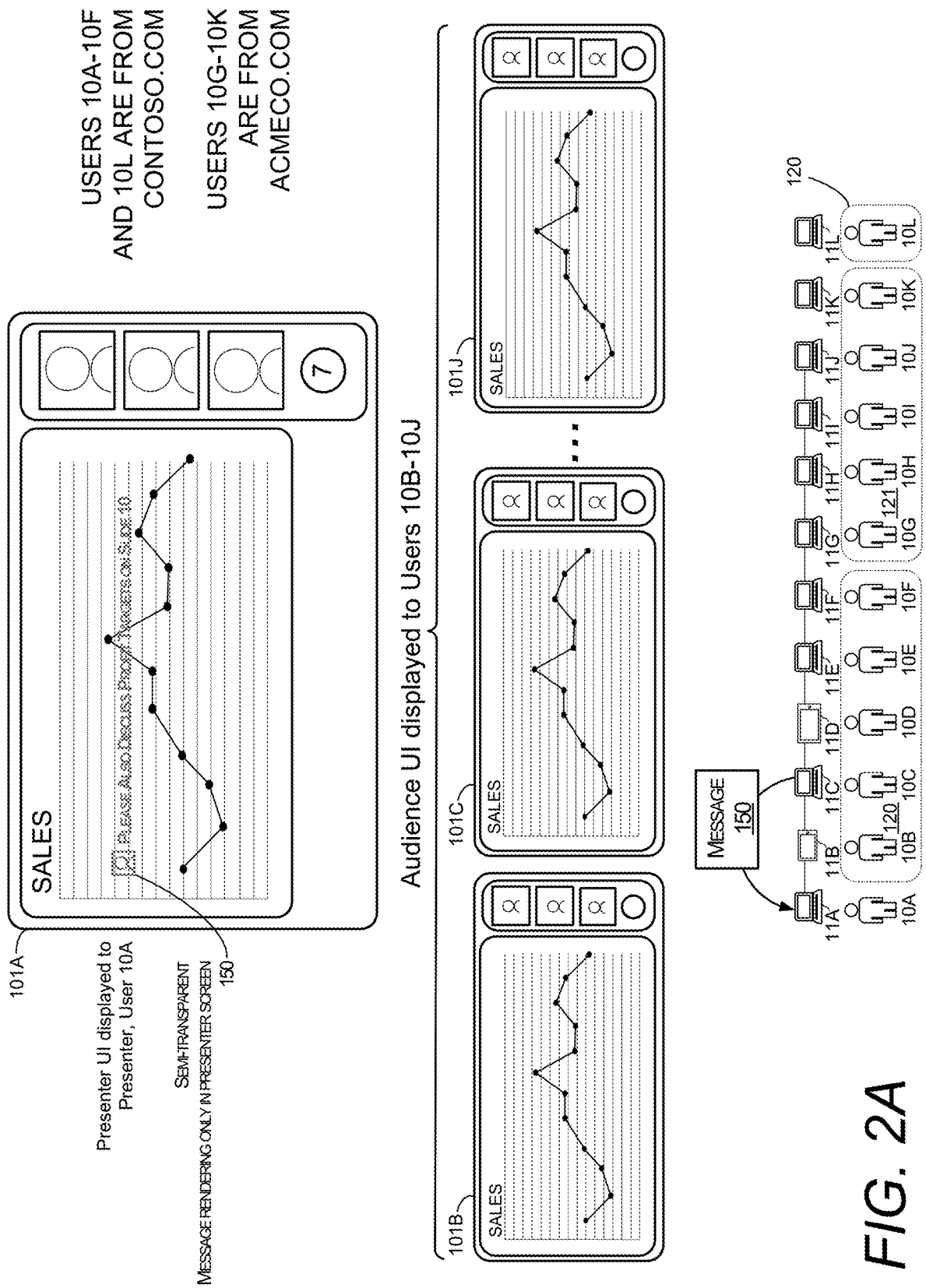
FIG. 2A is a block diagram of a system and example user interfaces for displaying messages to a presenter.

With reference to FIG. 2A, when one or more computing devices, such as first computing device 11A, receives the individual messages 150 from the permitted users 10B-10F and 10L, the individual messages 150 are directed to the predetermined user, e.g., the first user 10A, during the at least the portion of a predetermined event. For example, the messages may be directed to the first user 10A during a meeting or a stage of a meeting where the first user 10A is performing a specific function, e.g., controlling and presenting content to the other users. In this example, the third user 10C sends a message 150 to the first user 10A.

As shown in FIG. 2A, the individual messages 150 are displayed on a user interface 101A rendered on the computing device 11A associated with the first user 10A. The rendering can be generated in response to determining that the permission data identifies the sender of the message as a permitted user 120 allowed to communicate messages 150 to the predetermined user 10A during the presentation. The user interface 101A is configured to display the individual messages 150, received from the permitted users 120, to the predetermined user 10A while restricting the display of individual messages 150 that are received from other users 10G-10K, non-permitted users 121, of the plurality of users 10A-10L.

In the above example, the message 150 sent by the third user 10C is displayed on the user interface 101A as a semi-transparent overlay over the shared content that is controlled by the first user. Although this example shows the message being rendered over the content, e.g., the chart, it can be appreciated that the message may be displayed in any location of the user interface. In some embodiments, the position of the message can be placed in locations such that the messages do not cover content or cover salient content. As will be described in more detail below, the format and a level of transparency of the messages can also vary based on one more factors.

Also shown in FIG. 2A, the message 150 is displayed on the user interface 101A that is displayed by the first client computer 11A that is operated by the first user 10A. Also shown, the message 150 can be displayed with a graphical element identifying the user that sent the message. In this example, a graphical element shows an image of the sender, the third user, which is displayed with the message 150. Although this example includes a graphical element showing an image of the sender, it can be appreciated that other representations or descriptions of the sender can be used, e.g., a user's full name, a username, and/or other text to identify the user.

The system also controls the display of the messages such that the message 150 is not displayed to the other participants 10B-10J of the communication session. Thus, renderings of the shared content displayed to the other participants 10B-10J do not include a rendering of the message 150. However, as described below with respect to FIG. 9, in some configurations, the message 150 may be rendered on the user interfaces 101B-101F of some permitted users 120 if the permission data is configured to allow such renderings.

To control the display of the messages, such that the messages are only displayed to a predetermined user, e.g., a presenter, the system can communicate the individual messages to the computing device 11A associated with the presenter. The individual messages 150 from the permitted users 120 are only rendered on a display device in communication with the computing device 11A. In some embodiments, the rendering of the individual messages is configured to be displayed as an overlay over content controlled by the presenter. As described herein, the message is presented as an overlay on one display screen but the pixels are suppressed, replaced, removed, or obscured so the messages are not displayed to other users. In such embodiments, the presenter can share the content with a number of participants without communicating any received messages 152 to those participants.

In addition to the display of messages that are directed to a particular user, such as a presenter, the system may also provide notifications as messages are received. A type of notification can be selected based on a number of factors. For example, a type of notification can be selected based on at least one of, or on at least two of, a characteristic of the message or a characteristic of the sender. The characteristic can include a level of relevancy of the message relative to the presentation content, a role of the sender, a priority of the sender, a domain or address associated with the sender. For example, if the sender has the same domain as the recipient, the system may generate one type of notification versus a situation where the sender has a different domain than the recipient, in which case a second type of notification is generated. In addition, the type of notification can be based on other factors disclosed herein such as a location of the sender relative to the recipient.

A notification type can include, but is not limited to, a sound, a light, a display of a graphical element, a modification of a graphical element, or a combination thereof. Each type of notification can also have a number of properties. The properties can include a specific sound, a volume, a light level, a color of light, a shape, a display property or combination thereof. The notification type and the notification properties can be based on at least one of a role or attribute of a permitted user sending the individual message, a level of relevancy of the individual message relative to presentation content, a domain associated with the permitted user sending the individual message, or a priority of the message or the priority of the user sending the individual message. For instance, a message received from a CEO may provide one type of notification, such as a display of a graphical element, and a message from a mid-level manager can produce another type of notification, such as a playback of a sound. In another example, notification properties such as a duration and volume of a sound can increase for a first message having a first level of relevancy with respect to share content versus a second message having a second level of relevancy with respect to the content.

Figure 2B:
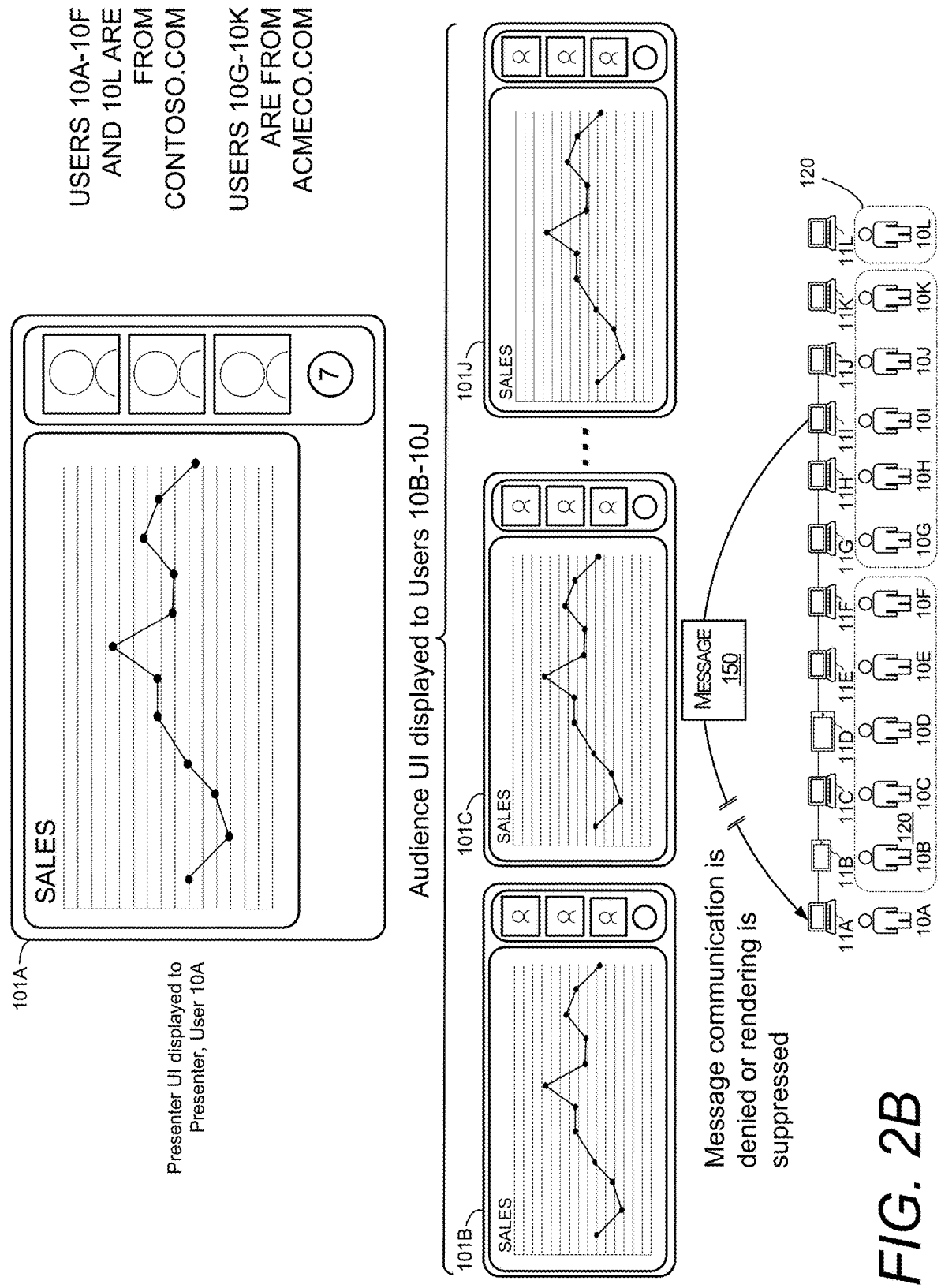
FIG. 2B is a block diagram of a system and example user interfaces that can restrict the display of messages to a presenter.

The system can also provide security features that restrict the delivery of messages to a particular user based on one or more factors. FIG. 2B shows an illustrative example where the non-permitted users 121 are restricted from sending messages to the first user. These restrictions may be applied during certain events or during portions of an event. For example, in some embodiments, the non-permitted users 121 may only be restricted from sending messages to a given user, e.g., the first user, during a presentation of the first user. The permission data can apply these restrictions contemporaneously with the permissions that allows the permitted users 120 to deliver messages to the first user. In such configurations, when one or more computing devices, such as first computing device 11A, receives messages 150 from on of the non-permitted users 10G-10K, one or more computing devices restricts or prevents the display of the these messages from being displayed on the user interface 101A associated with the first user. This restriction can be based on the permission data identifying the users that are restricted from communicating the individual messages to the presenter during the presentation or during a predetermined event.

In some configurations, display characteristics of the messages, such as an order, size, position, color, brightness level, contrast level, or a transparency level, can vary based on a number of factors. An order of the messages can involve an arrangement of a plurality of messages where some messages are positioned in more prominent locations over other messages based on one or more factors. In other examples, the display characteristics can also include a sustain rate for each message. This allows some messages to persist indefinitely or be displayed for longer periods of time over other messages depending on one or more factors that apply to each message.

Any one of the characteristics can be increased or decreased, or rather configured to be more visually prominent or less visually prominent based on one or more factors. Some example factors can include a priority of the user sending a message, a role of the user sending a message, a priority level of the message content, a level of relevancy of the message relative to the shared content, or any other attribute of the message or user sending the message. In other examples, the display characteristics of a message can be based on an email address, title, or rank of the user sending the message.

Figure 3:
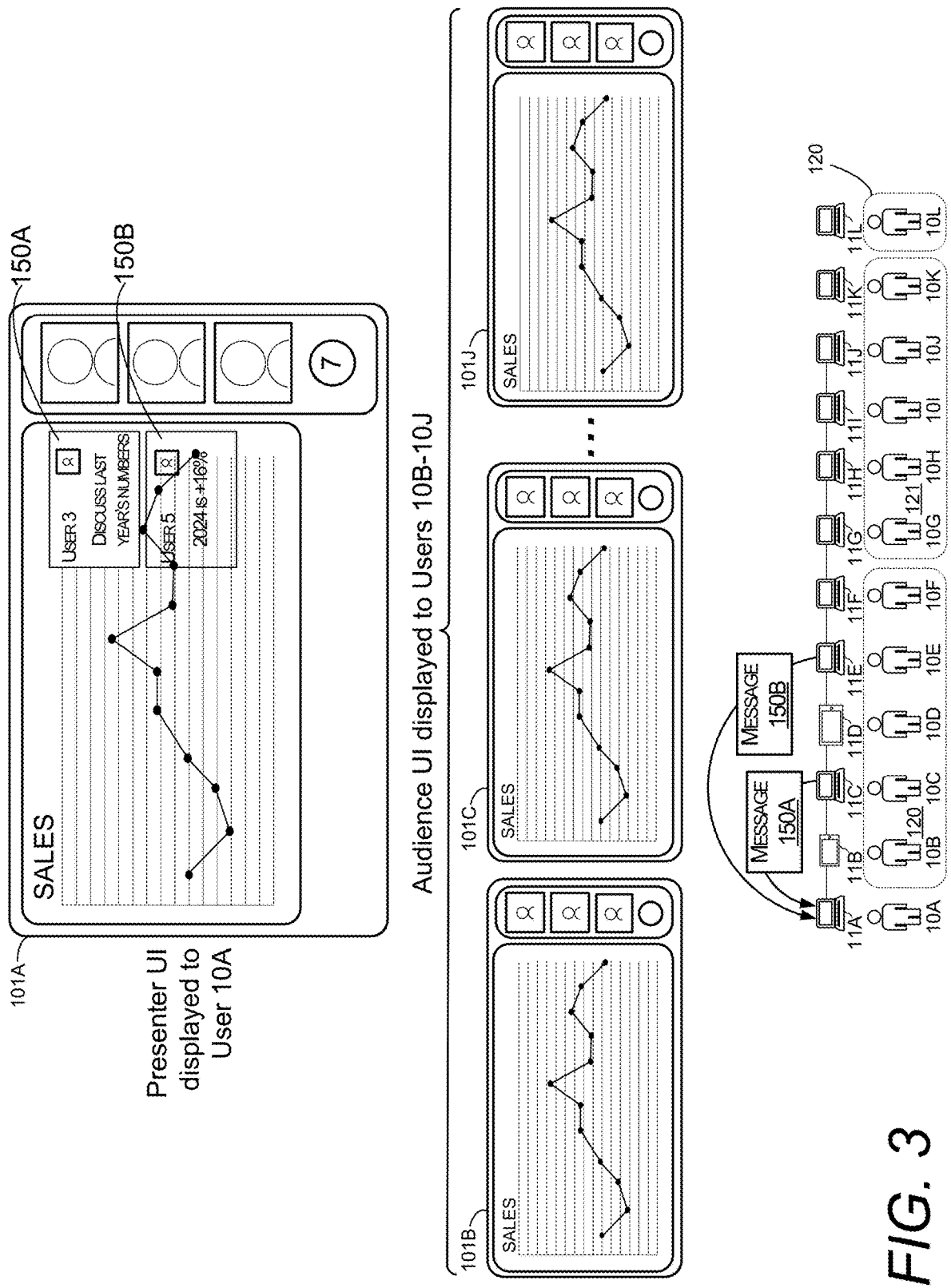
FIG. 3 is a block diagram of a system and example user interfaces for displaying ranked messages to a presenter.
Figure 4A:
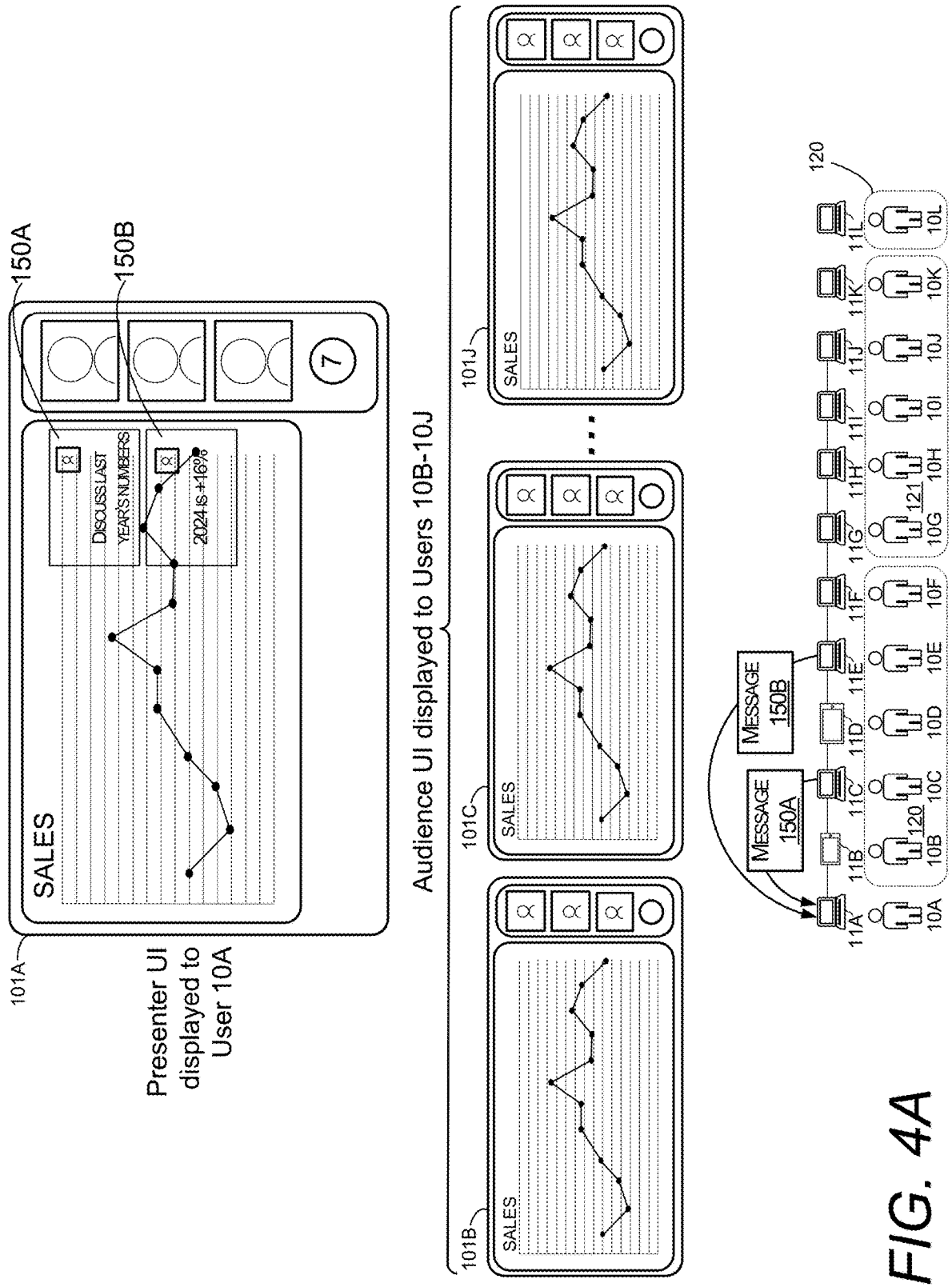
FIG. 4A is a block diagram of a system and example user interfaces for displaying a first stage of a process where messages are modified based on one or more factors.
Figure 4B:
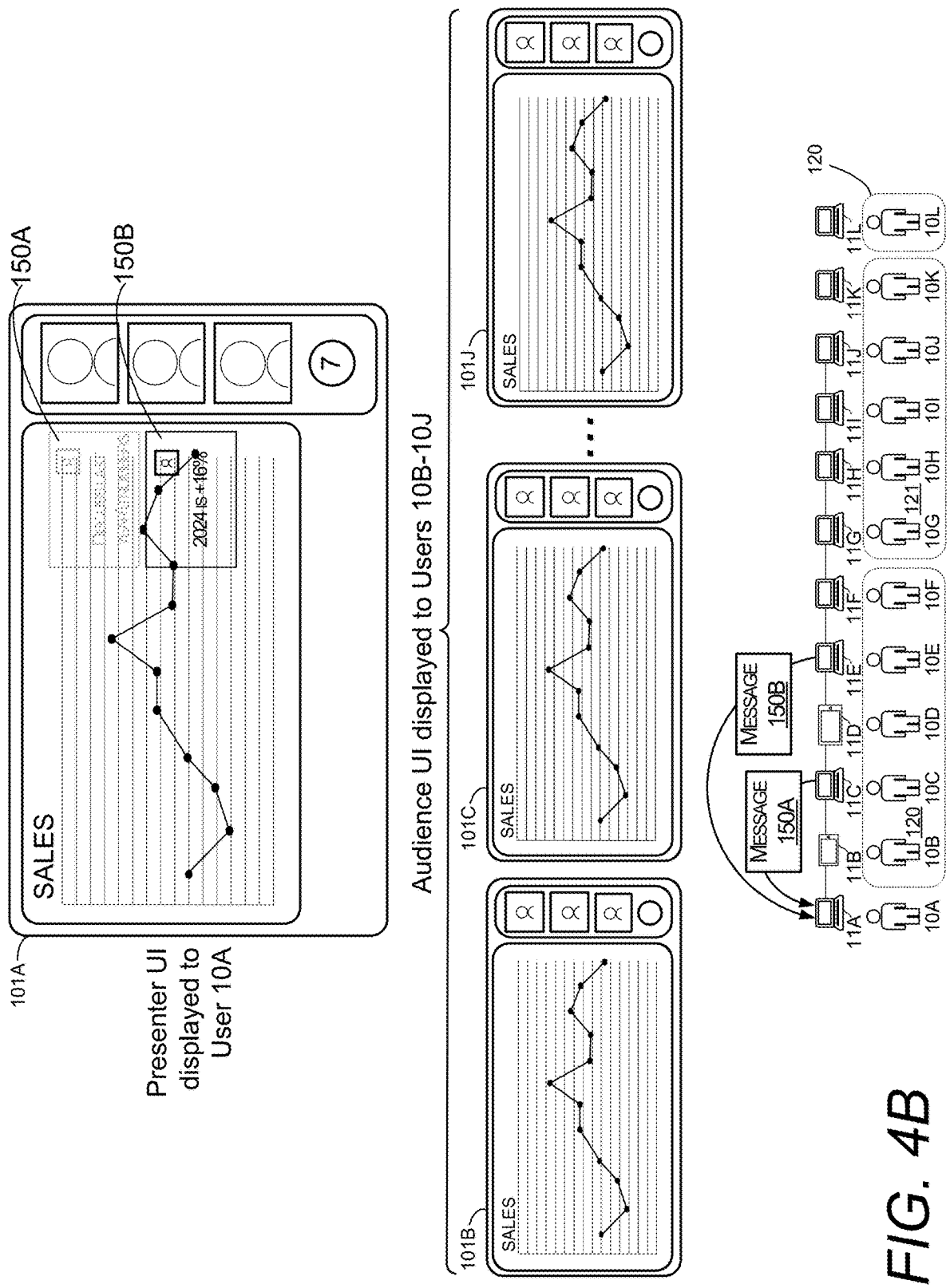
FIG. 4B is a block diagram of a system and example user interfaces for displaying a second stage of a process where messages are modified based on one or more factors.
Figure 4C:
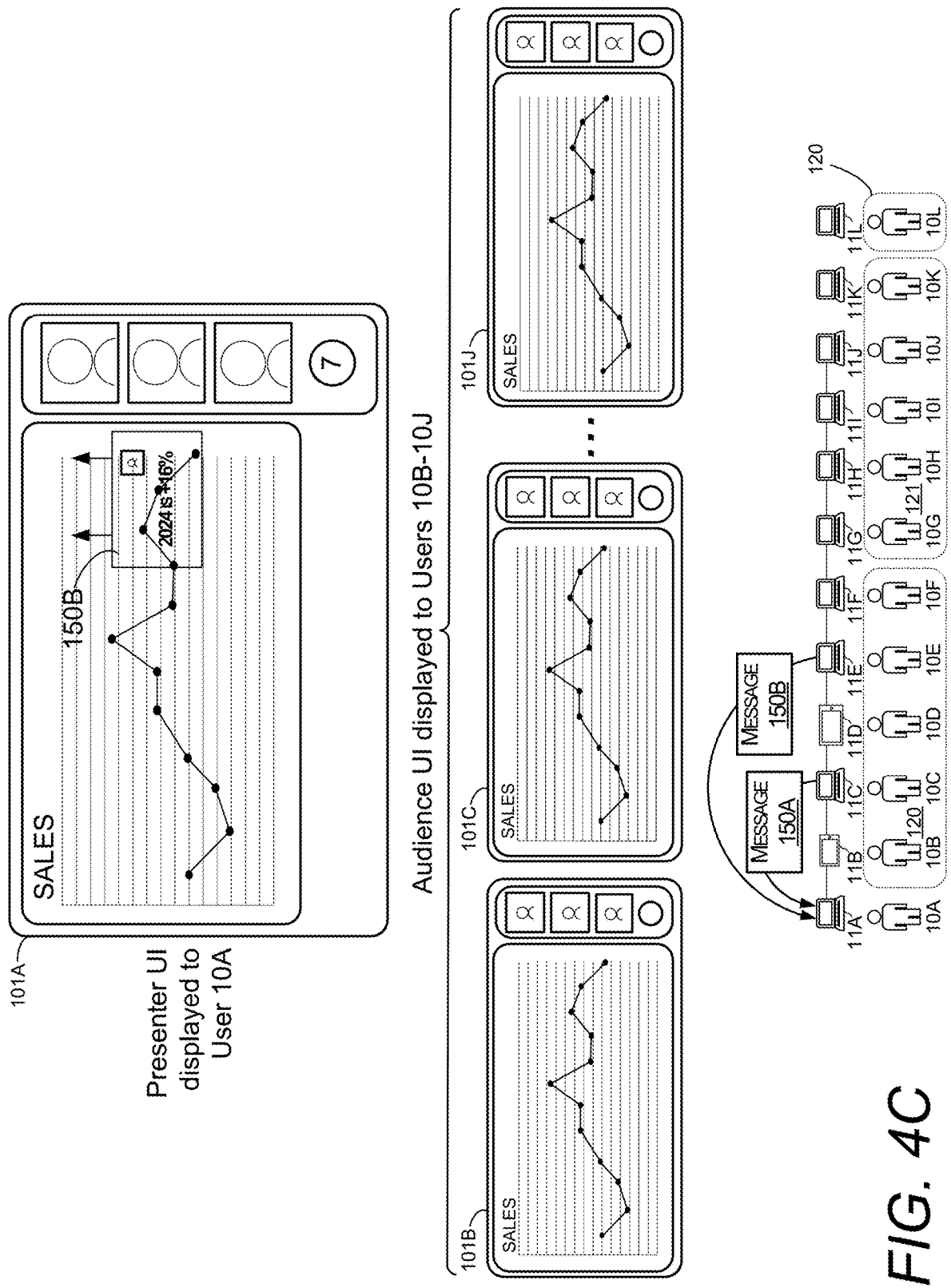
FIG. 4C is a block diagram of a system and example user interfaces for displaying a third stage of a process where messages are modified based on one or more factors.
Figure 4D:
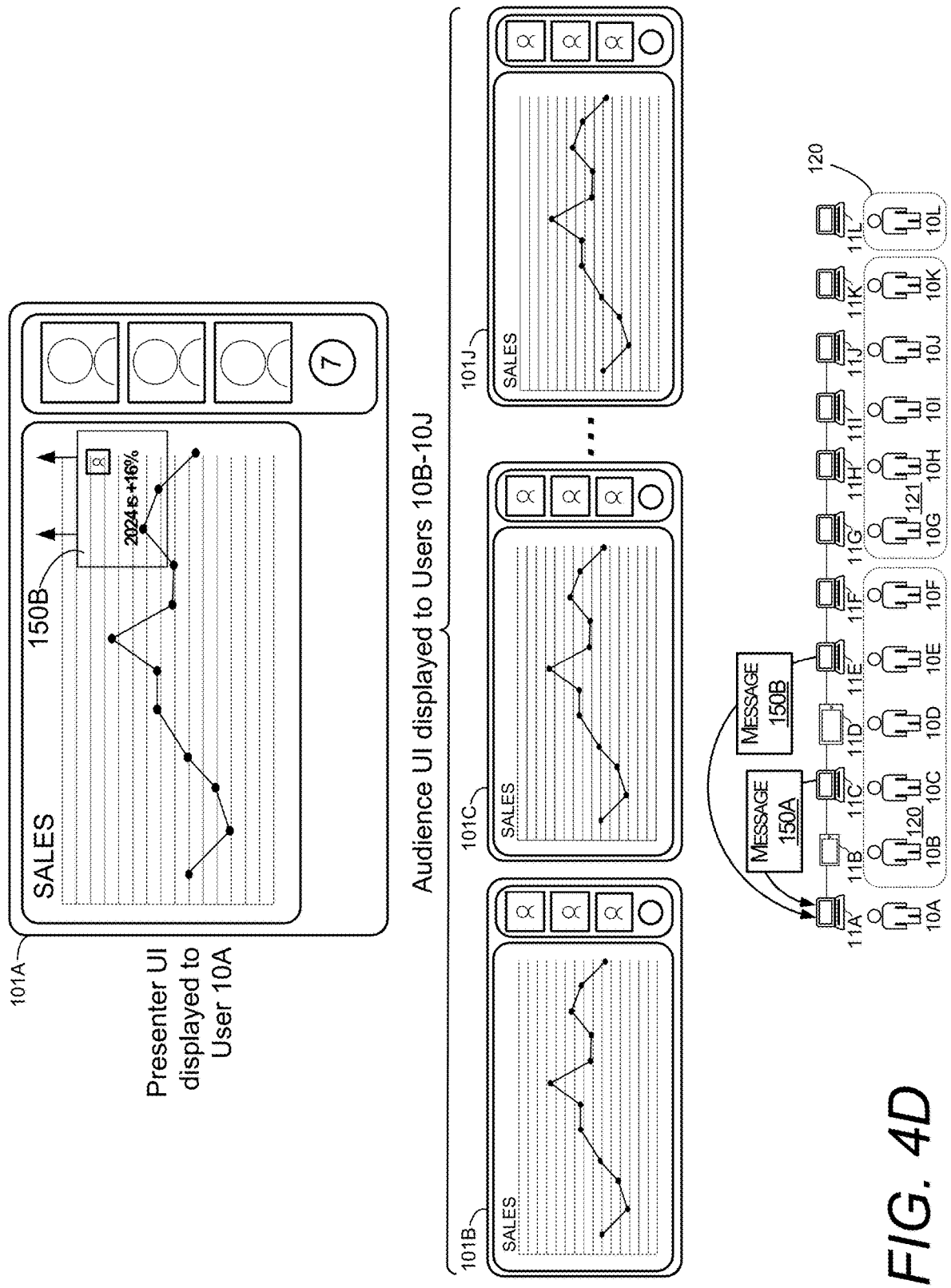
FIG. 4D is a block diagram of a system and example user interfaces for displaying a fourth stage of a process where messages are modified based on one or more factors.
Figure 4E:
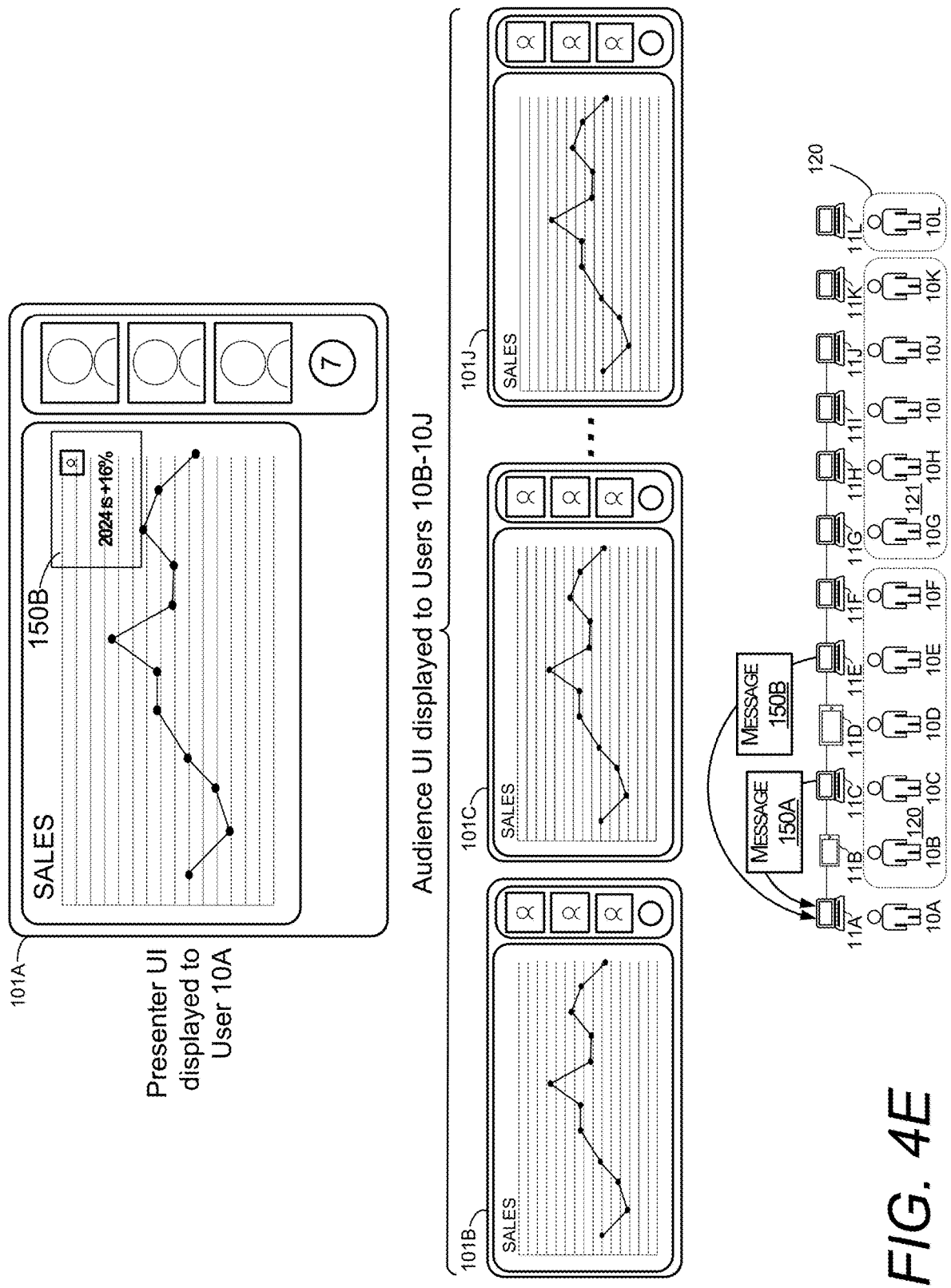
FIG. 4E is a block diagram of a system and example user interfaces for displaying a fifth stage of a process where messages are modified based on one or more factors.

FIG. 3 illustrates one example where messages can be configured and arranged according to a priority of individual messages or a priority of the users sending the messages. Consider a scenario where the third user 10C and the fifth user 10E are respectively titled within an organization as a CEO and a manager. In this scenario, the message 150A from the third user 10C placed in a more prominent position, size, and/or level of transparency, over the message 150B from the fifth user 10E. In this example, the first message 150A is placed above the second message 150B. Although this example shows how messages can be arranged based on a priority or rank of the senders, it can be appreciated that any display characteristics of a message can be modified based on any of the factors described herein.

Referring now to FIGS. 4A-4E, an example showing a level of sustainability of messages is shown and described below. In this example, a first message 150A from the third user 10C is determined to be a lower priority than a second message 150B from the fifth user 10E. A priority of a message can be based on a combination of factors including a location and/or a rank of an individual sender, e.g., a sender that shares a building or team with the presenter may increase or decrease the priority of the first message 150A, and a sender that does not share a building or team with the presenter may increase or decrease the priority of the second message 150B. Other factors may increase or decrease the priority of each message, such as a rank of the respective sender, a level of relevancy of each message, a business entity associated with the respective sender, etc. For instance, based on a relevancy score if the first message 150A is more relevant than the second message 150B, the first message 150A may have a higher priority than the second message 150B. The message having a higher priority may have a higher level of sustainability, e.g., be displayed for a longer period of time versus other messages having a lower priority.

For illustrative purposes, consider a scenario where the first message 150A has a lower priority than the second message 150B based on a combination of the factors disclosed herein. However, the first message may be placed on top of the second message because the first message was received before the second message. Once both messages are displayed, the priority of each message influences the sustainability of each message. Given that the second message has a higher priority, the second message 150B has a higher sustainability rate than the first message 150A. As shown in the transition between FIGS. 4A-4E, since the second message 150B has a higher sustainability rate than the first message 150A, the display of the first message 150A decays more rapidly than the second message. In such a scenario, the second message may also be placed in a more prominent position as the first message fades.

Figure 5A:
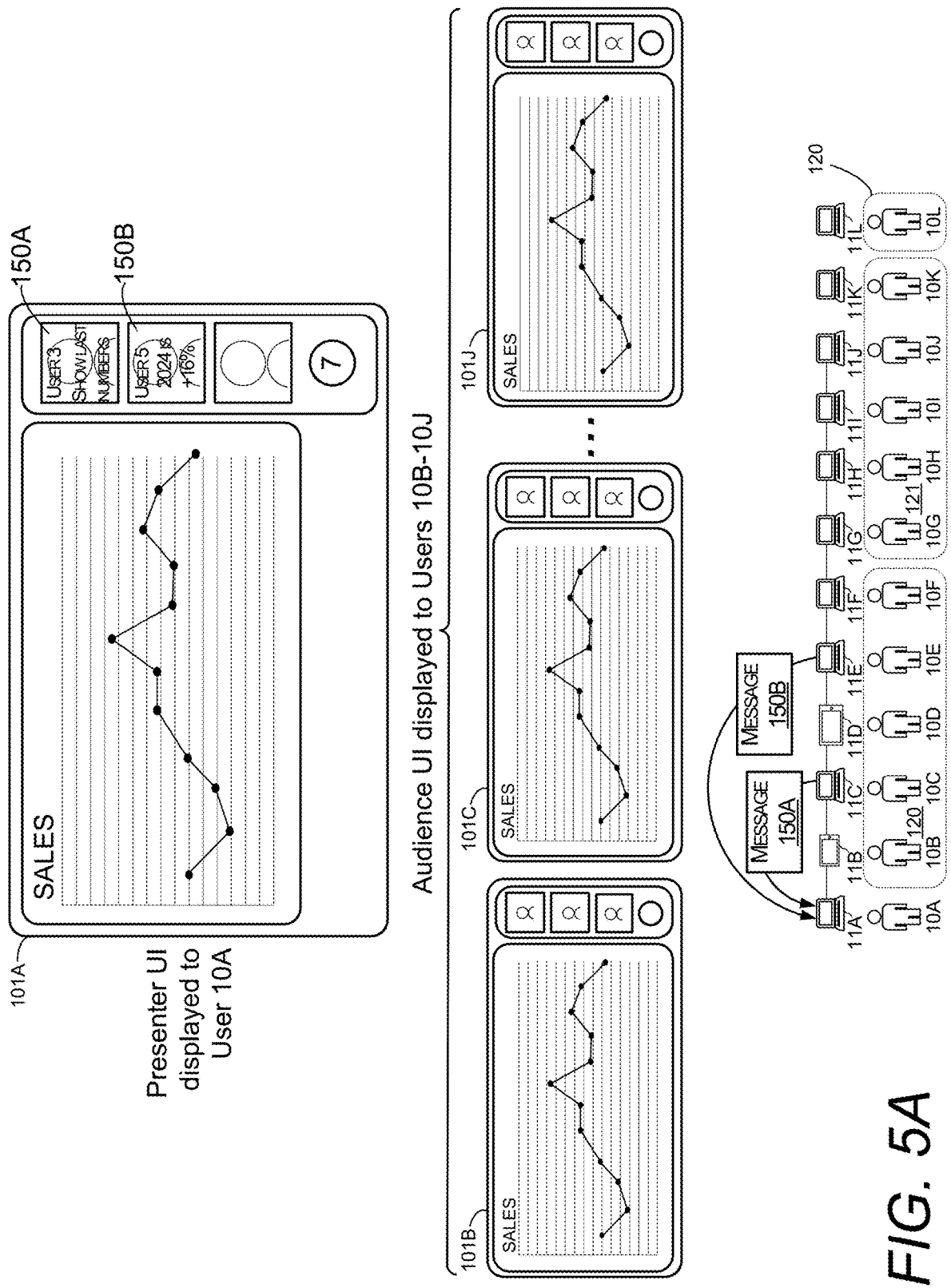
FIG. 5A is a block diagram of a system and example user interfaces for displaying a first stage of a process where messages are displayed in thumbnail previews of individuals that are associated with an action of sending the messages.

In some embodiments, the individual messages communicated to a presenter can also be displayed within thumbnail renderings associated with a source of each message. FIG. 5A illustrates an example user interface 101A comprising shared content, e.g., the sales chart. In this example, the first user is controlling the display of the shared content while giving a presentation of the shared content with other participants of a communication session. In this example, the shared content is displayed contemporaneously with thumbnail images of other participants of a communication session, each of which can be a source of a message.

The thumbnail images can be arranged based on and activity level of messages sent from each participant. The activity level may be based on a quantity of messages, a quantity of data sent in the messages, a priority associated with each message, or a priority associated with the source of each message. For instance, if the second user 10B sends more messages than the third user 10C, the second user may be positioned higher on an arrangement of participant thumbnail video streams. In another example, if the second user 10B sends more messages than the fifth user 10E, the second user may be displayed on an arrangement of participant thumbnail video streams, while the fifth user is not displayed. In such an example, the messages 150 can be displayed as a semi-transparent overlay over the thumbnail of each respective author of the messages. Specifically, messages sent from the second user 10B are displayed as a semi-transparent overlay over the image of the second user 10B. Messages sent from the fifth user 10E are displayed as a semi-transparent overlay over the image of the fifth user 10E.

Figure 5B:
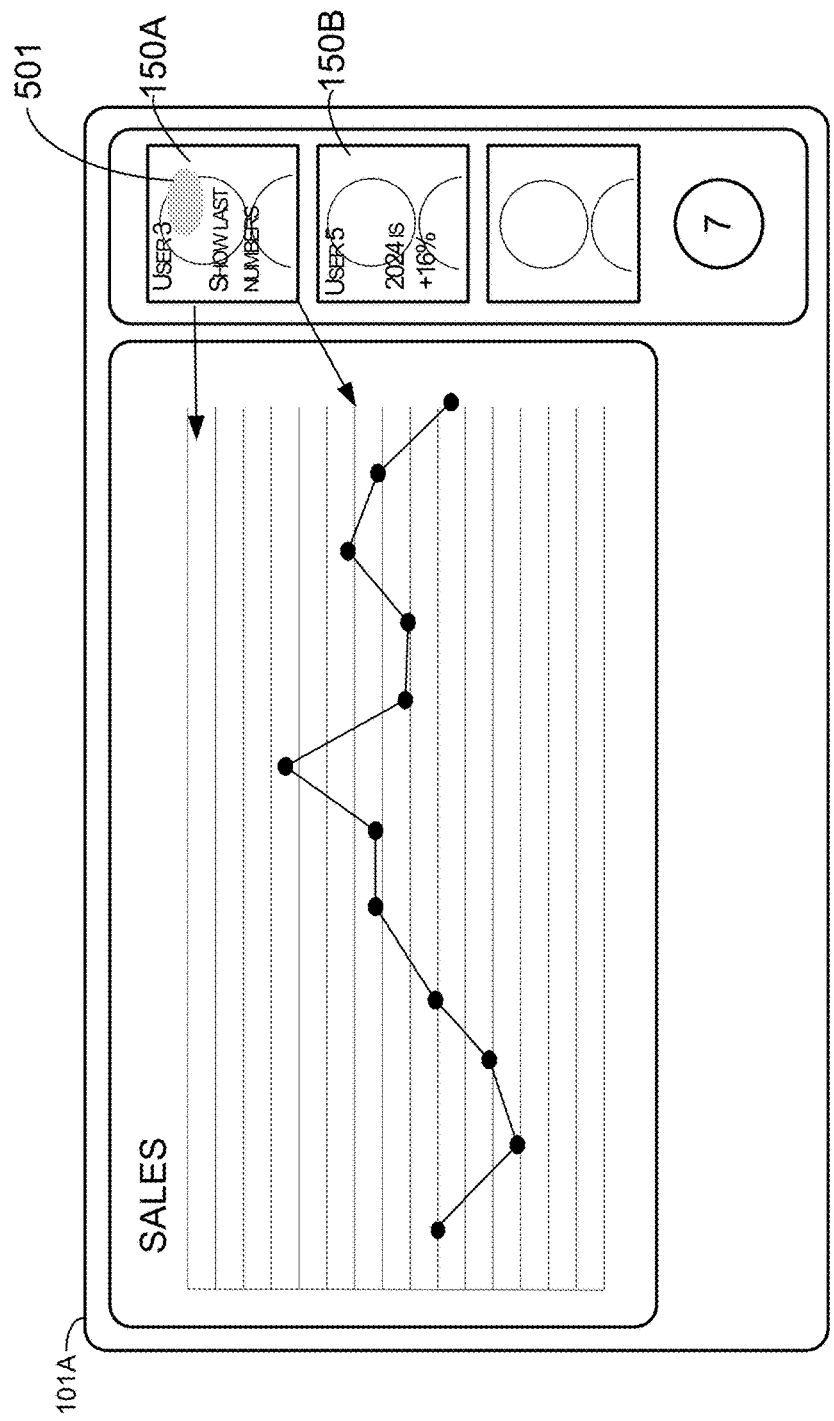
FIG. 5B is an example user interface for displaying a second stage of a process where messages are displayed in thumbnail previews of individuals that are associated with an action of sending the messages.
Figure 5C:
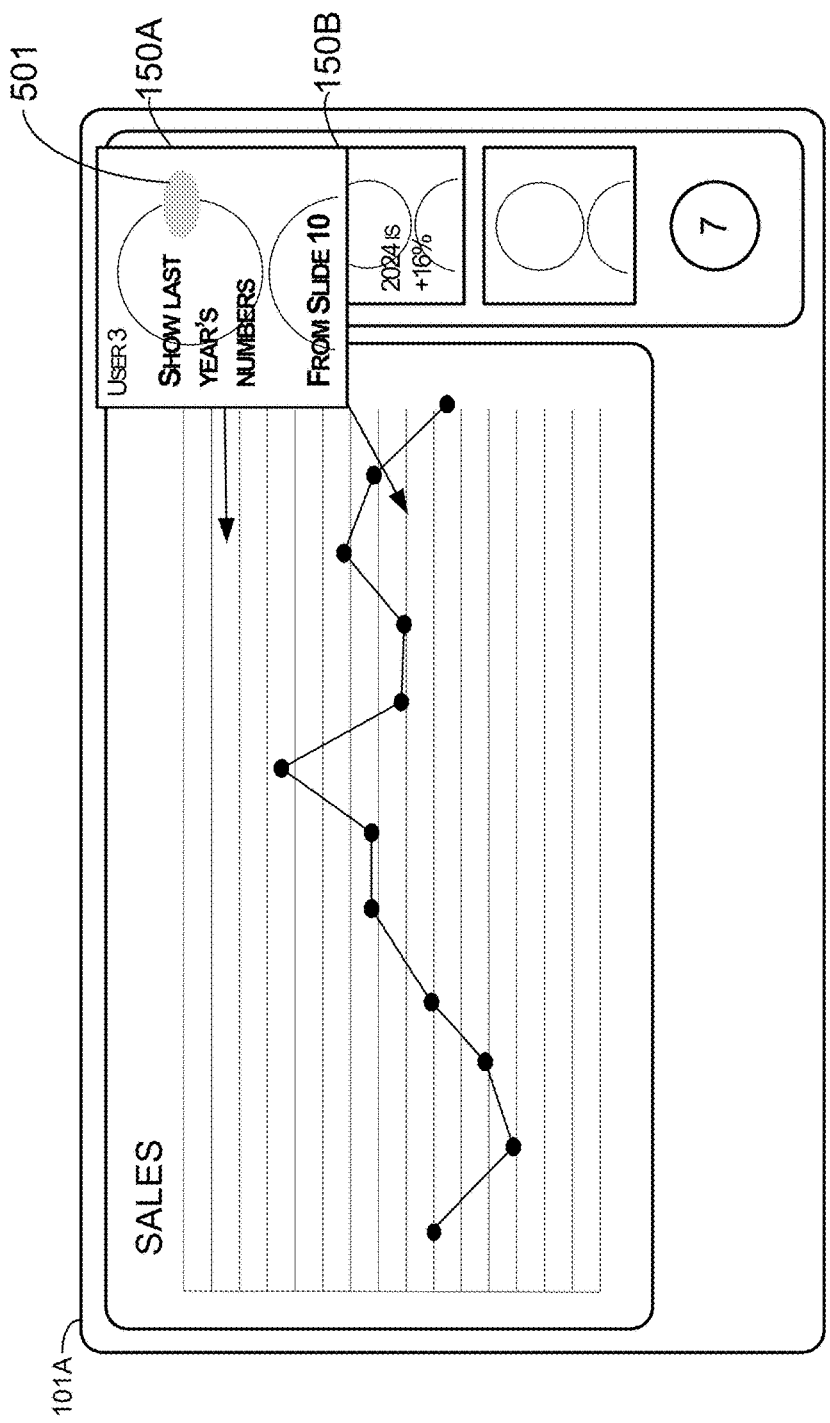
FIG. 5C is an example user interface for displaying a third stage of a process where messages are displayed in thumbnail previews of individuals that are associated with an action of sending the messages.
Figure 5D:
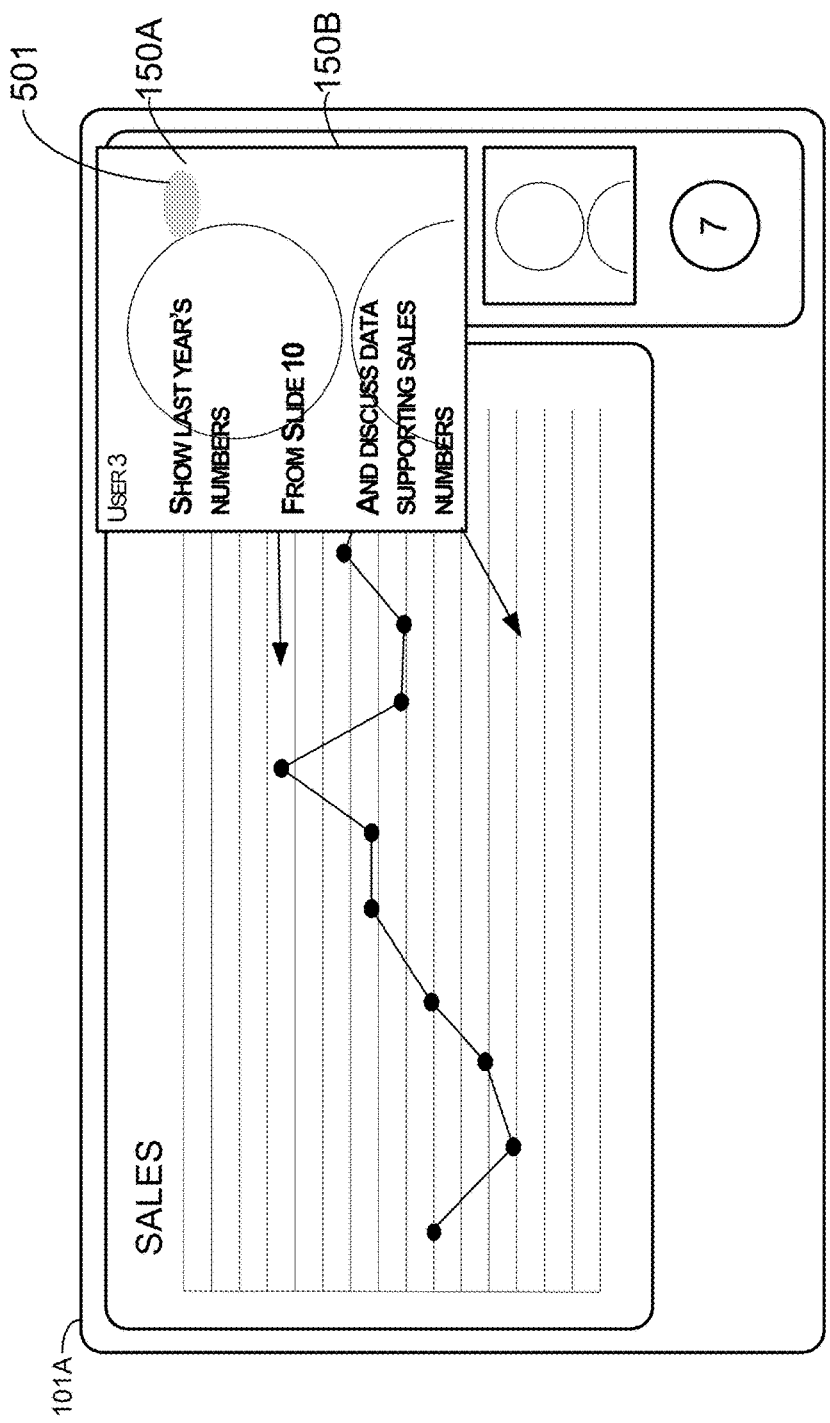
FIG. 5D is an example user interface for displaying a fourth stage of a process where messages are displayed in thumbnail previews of individuals that are associated with an action of sending the messages.
Figure 5E:
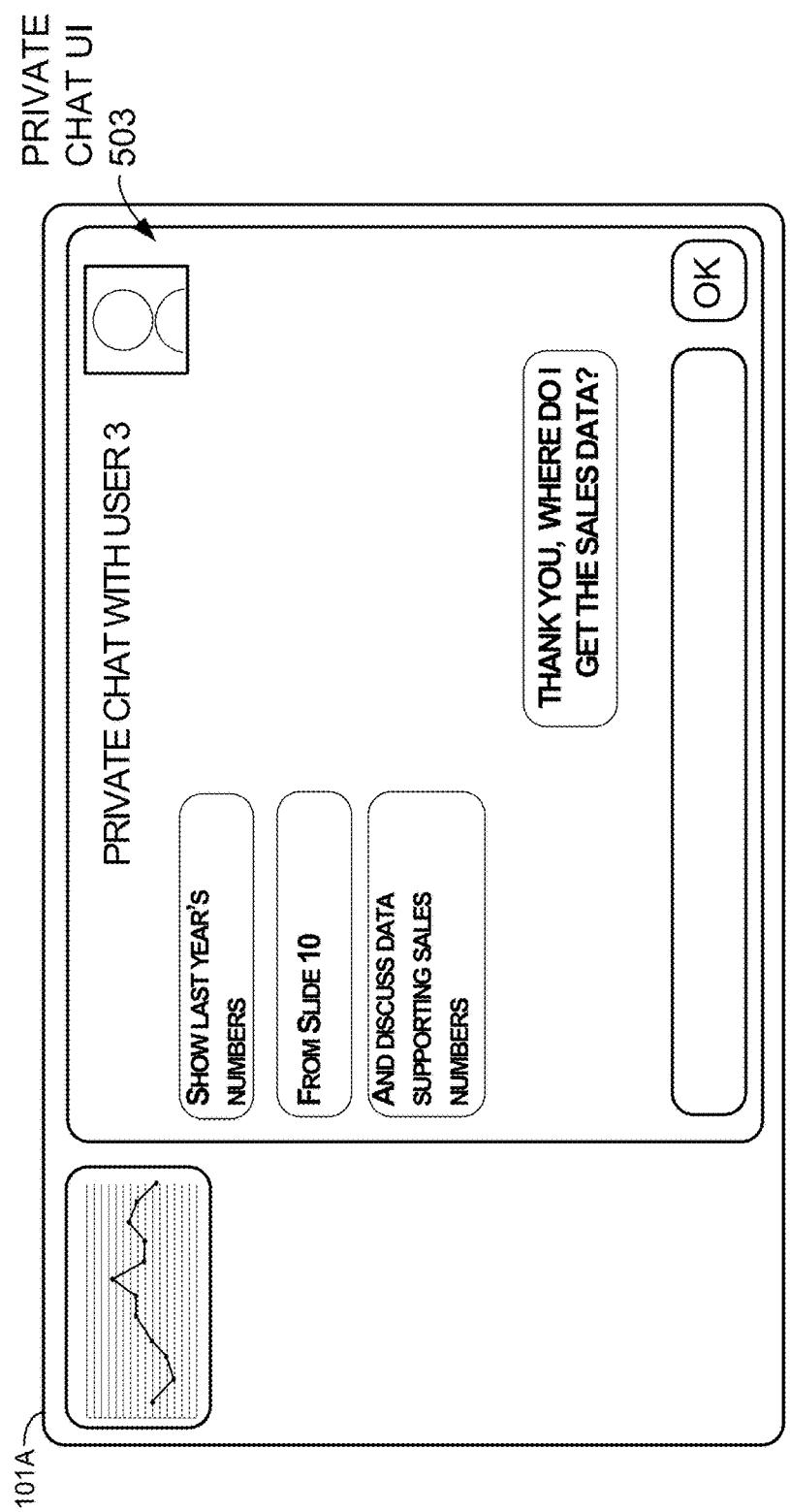
FIG. 5E is an example user interface for displaying a fifth stage of a process where a system transitions from a user interface with thumbnail previews to a chat user interface.

As shown in the transition between FIGS. 5B-5E, a user selection of a particular message can cause the user interface to transition to a new arrangement that shows an increasing level of detail of messages from an individual user. For instance, as shown in FIG. 5B, a user input, such as an eye gaze gesture causing the generation of a gaze target 501 within the thumbnail of the third user 10C, can cause a selection of messages from the third user. In response to the selection, as shown in FIG. 5C, the user interface can increase the size of the thumbnail of the third user 10C and also increase the size of the messages received from the third user 10C. Based on one or more gestures, such as a continued eye gaze gesture towards the thumbnail of the third user 10C, as shown in FIG. 5D, the user interface can increase the size of the messages and the thumbnail of the third user 10C. After a continued eye gaze gesture directed towards the third user 10C, e.g., the eye gaze occurs past a threshold period of time, as shown in FIG. 5E, the user interface can transition to a new user interface arrangement 503 that shows a full list of messages received from the third user 10C. In this environment, the chat session may be displayed contemporaneously with the shared content, e.g., the sales chart. This arrangement allows the presenter to focus on the messages in more detail while also maintaining a view of the shared content.

Figure 6:
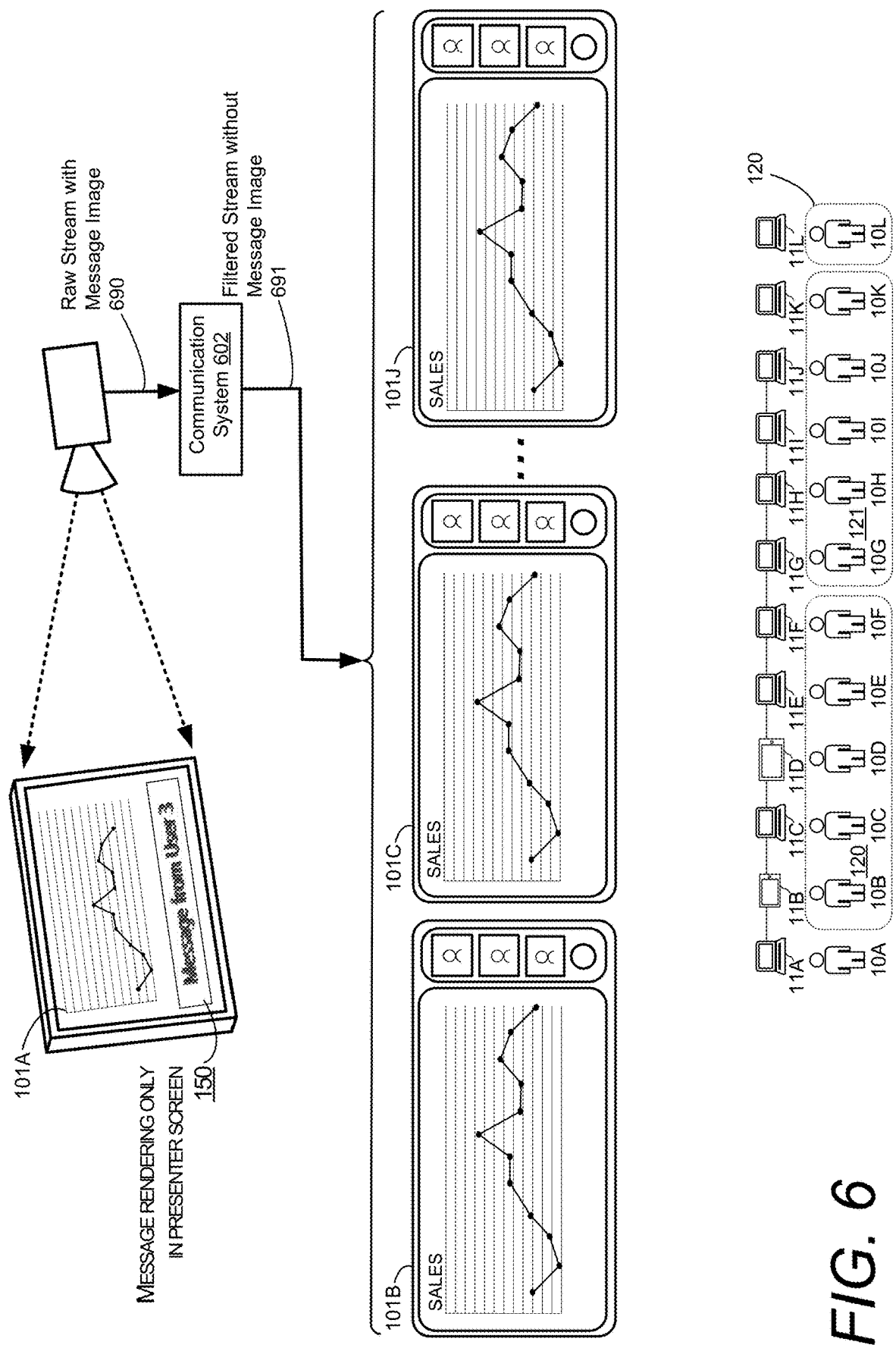
FIG. 6 is a block diagram of a system and example user interfaces for displaying aspects of a process for obscuring or replacing pixels of messages that are displayed on shared content.

Embodiments disclosed herein can also extract, block, obscure, or replace pixels of messages to prevent unauthorized users, such as the non-permitted users, from receiving or viewing messages that are sent to, and displayed by, a presenter. Such embodiments may be needed in a scenario where a presenter is using a projection device or a large-screen device to display their shared content in conjunction with a camera for capturing a live stream of their presentation. As shown in FIG. 6, when a camera is utilized to capture an image, also referred to herein as a video stream, of shared content displayed on a user interface 101A, the camera can generate a first video stream 690 showing the raw footage of the presentation content, which can also include the display of messages 150 that are overlaid on shared content. The first video stream 690 is then processed by a communication system 602 to generate a second video stream 691 which includes a rendering of the shared content without the pixels showing the messages. The pixels of the messages may be extracted, blocked, replaced, obscured, or removed prior to sending the second stream 691 to the participants 10A-10J of the communication session. This feature enables the permitted users 120 to send messages to the presenter 10A while also maintaining privacy and security of the messages with respect to other users, such as the non-permitted users 121. This feature also allows the system to place the messages 150 in a position that allows the presenter to readily see the messages while also maintaining a level of privacy and security with respect to the messages. Specifically, the system can prevent the messages 150 from being displayed or otherwise communicated to the non-permitted users 121, and even prevent some of the permitted users from viewing or receiving or viewing the displayed messages depending on the permissions for each permitted user.

Figure 7:
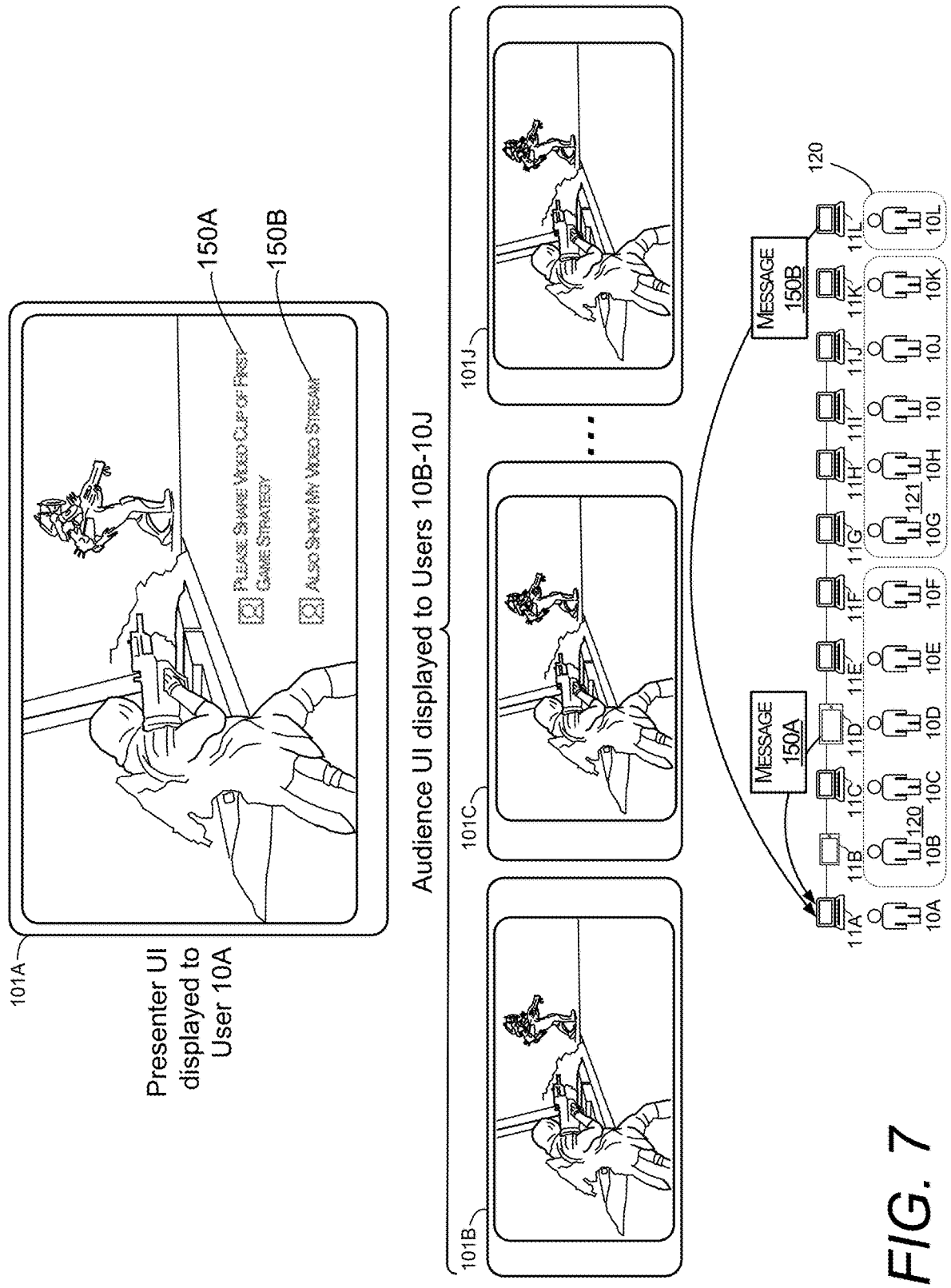
FIG. 7 is a block diagram of a system and example user interfaces for displaying messages as an overlay over shared content displayed on a video player application.
Figure 8:
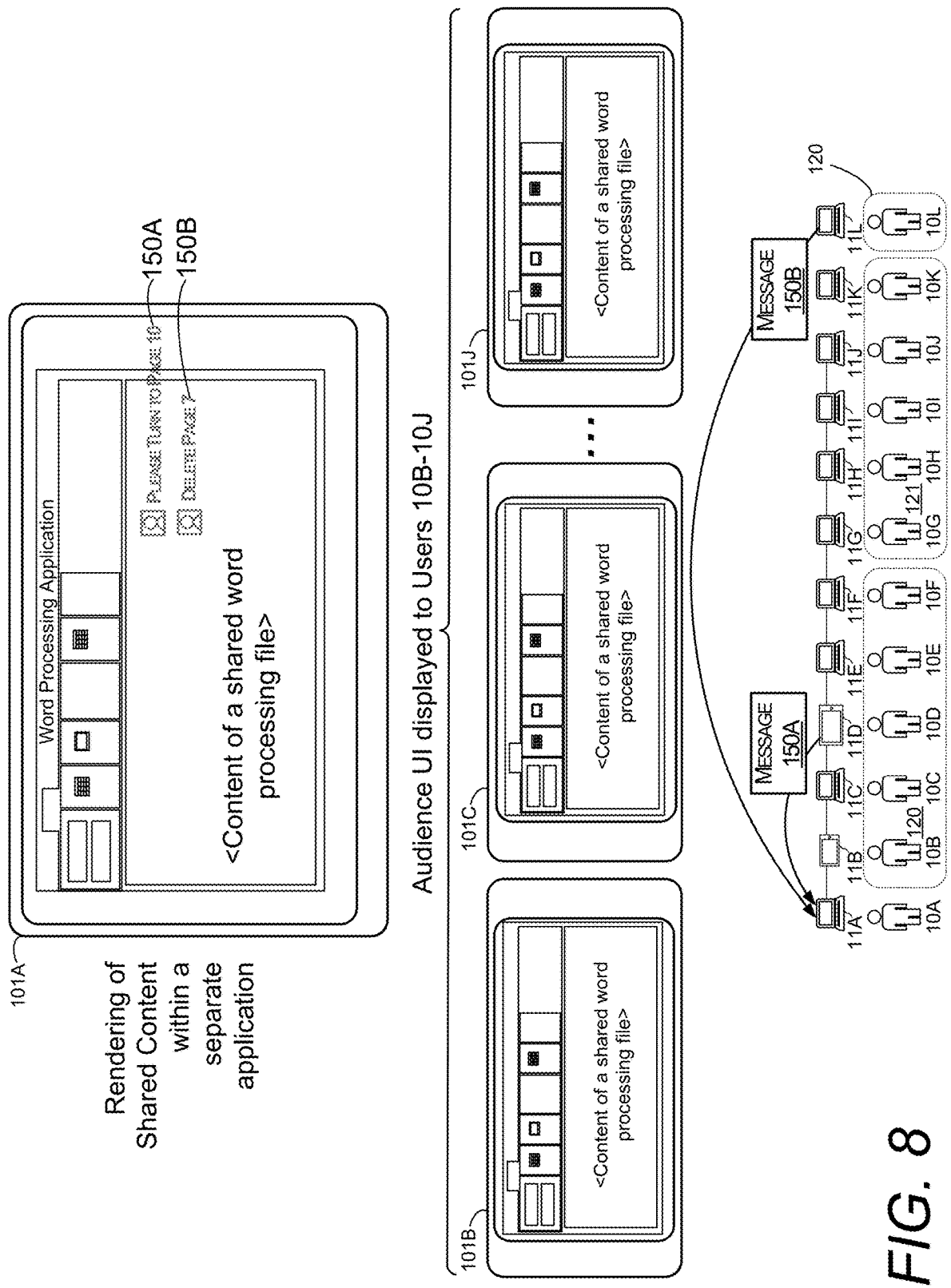
FIG. 8 is a block diagram of a system and example user interfaces for displaying message as an overlay over shared content displayed on a word processing application.

Although the examples disclosed herein illustrate user interface arrangements involving a communication application, such as Google Duo, Zoom, or MS Teams, it can be appreciated that the disclosed techniques can also apply to implementations where content is shared by another application or platform, such as a shared view of a word processing application, a shared view of a video player, or a shared desktop. FIGS. 7 and 8 illustrate examples where a presenter can share video content using a video player or by using an application such as a word processing application. In such scenarios, the techniques disclosure in can allow permitted users to send messages to the presenter. The messages from the permitted users are then displayed as semi-transparent renderings over the shared content. In the example of FIG. 7, the presenter is utilizing a video player to share video content. When the permitted users send messages 150 to the presenter, the messages 150A and 150B are rendered over the video content using a semi-transparent overlay. The messages are only rendered on the user interface of the presenter and the messages are not displayed on, or communicated to, device is associated with the non-permitted users. If the permission data is configured accordingly, the overlaid messages can be displayed to the permitted users. The system also prevents the messages received from the non-permitted users from being displayed to the presenter.

In the example of FIG. 8, the presenter is utilizing a word processing application to share an image of the word processing application to participants of the communication session. When the permitted users send messages to the presenter, the messages are rendered over the user interface of the word processing application. This embodiment is unique in that the messages do not change the content file of the word processing application. The messages are rendered over an image of the application to draw the presenter's attention but the messages are displayed in a manner such that it does not modify the content that is managed by the word processing application. The messages are only rendered on the user interface of the presenter and the messages are not displayed on, or communicated to, devices of the non-permitted users. If the permission data is configured accordingly, the overlaid messages can be displayed to the permitted users. The system also prevents the messages received from the non-permitted users from being displayed to the presenter.

In some configurations, the system can allow one or more permitted users 120 to view messages sent from other permitted users 120. In the example shown in FIG. 9, permission data can be configured to cause the system to generate a number of user interfaces 101B-101F that are displayed to the permitted users 10B-10F participating in the communication session. The user interfaces 101B-101F also display the messages 150A and 150B received from certain users, such as the third user and the fifth user. This arrangement allows the permitted users 120 to see the message shared from certain users to the presenter during a presentation. The feature may be useful when all permitted users are coordinating messages to a particular user, such as a presenter.

Figure 9:
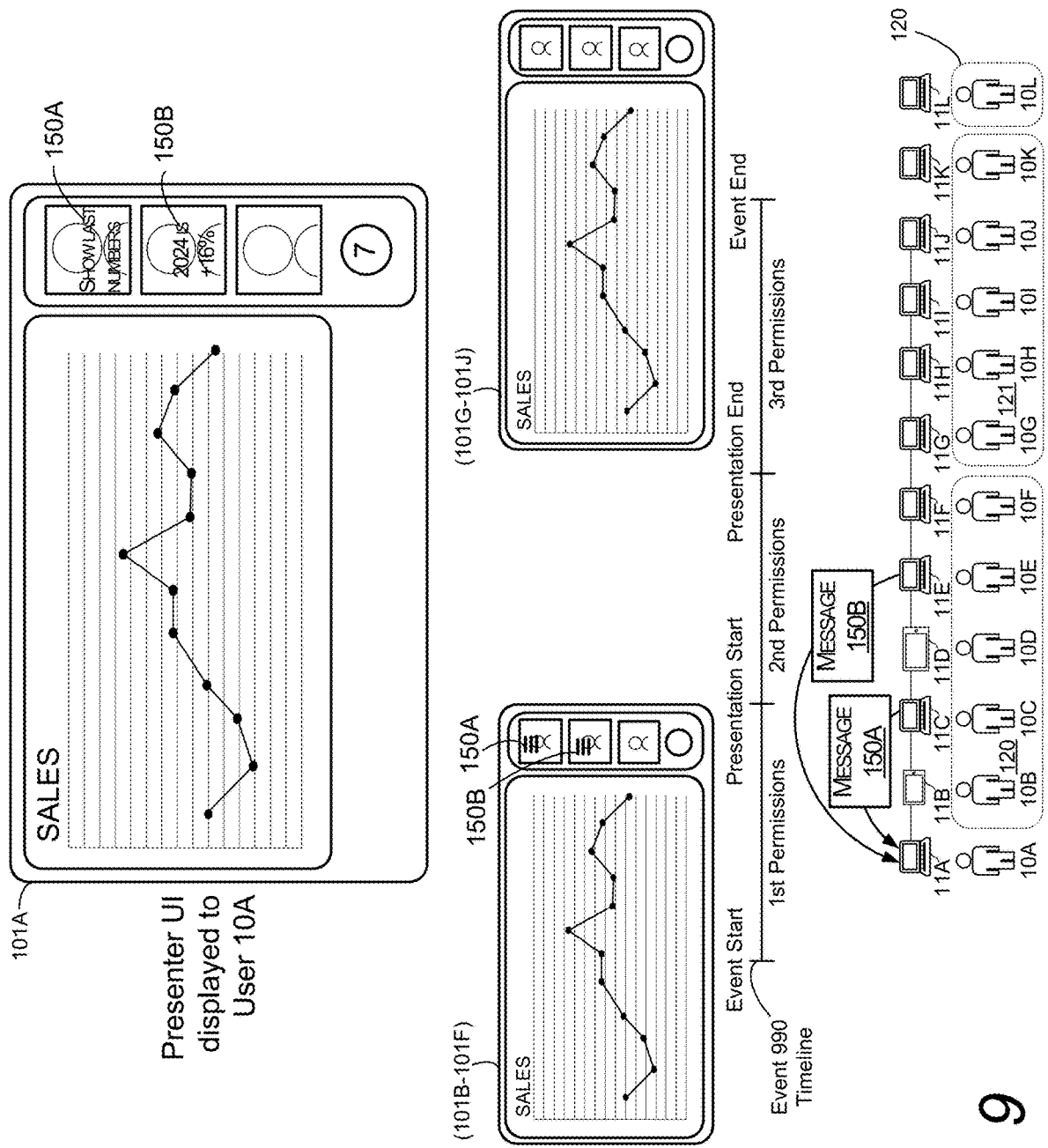
FIG. 9 is a block diagram of a system and example user interfaces for displaying messages as an overlay to a presenter and select user of a group of permitted users.
Figure 10:
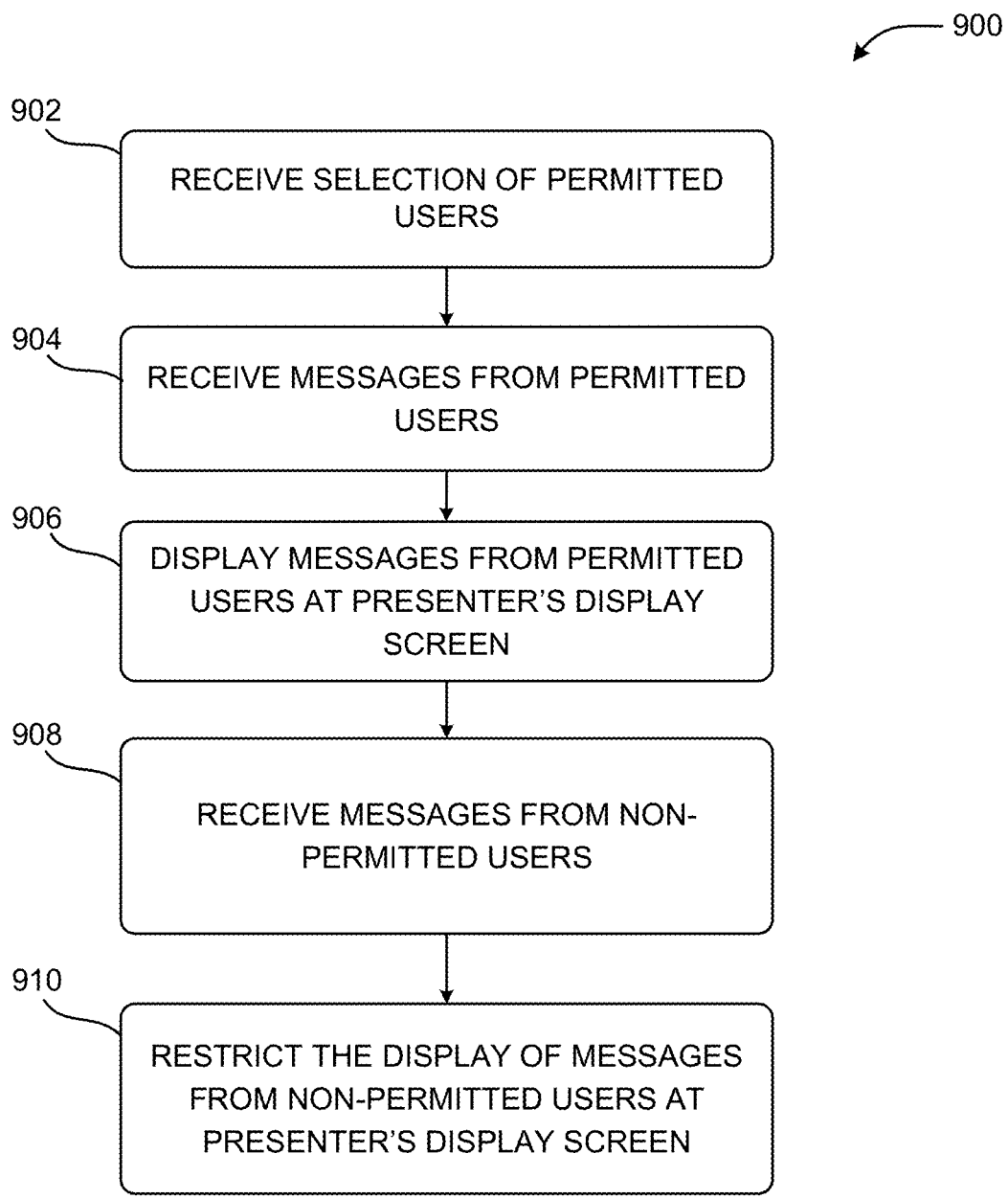
FIG. 10 is a flow diagram showing aspects of a routine implementing aspect of the present disclosure.

In the embodiment shown in FIG. 9, individual messages 150 are also rendered within or near a rendering representing the sender of the message on the user interface 101A displayed to the presenter. Here the message 150A received by the third user 10C is rendered over an image of the third user 10C in the user interface 101A. In addition, the message 150B received by the fifth user 10E is rendered over an image of the fifth user 10E in the user interface 101A.

The permissions may also be established at a granular level to allow a subset of the permitted users 120 to view the messages received by the presenter, while restricting another subset of the permitted users 120 from viewing the messages received by the presenter. For example, a first user interface arrangement showing individual messages 150 over a visual representation of each respective sender (shown on the left side of FIG. 9) can be displayed to the second user 10B through the fifth user 10E. However, the permissions may be configured to cause the system to display a second user interface arrangement that does not show the individual messages 150 (shown on the right side of FIG. 9) to the sixth user 10F. This allows some of the permitted users to view the messages while restricting other permitted users from viewing or receiving the messages.

As in all of the embodiments described herein, the system may automatically modify or activate different sets of permissions as a system through stages of an event. For instance, at the start of an event, a first set of permissions can allow certain users to send messages to a first set of individuals. The system can then transition to a second set of permissions upon the start of a new portion of an event, such as the beginning of a presentation. The second set of permissions can allow other users to send messages to a second set of individuals, such as a presenter. The system can then transition to a third set of permissions upon the conclusion of the presentation. The second set of permissions can be deactivated when the presentation of that particular user has concluded, e.g., when the content is no longer shared by the designated presenter. Thus, the system can allow or deny another set of users to communicate messages to yet another set of users, e.g., other presenters. Although the examples herein refer to a presenter, it can be appreciated that any of the features disclosed herein can apply to permissions for controlling messages that are directed to any particular person, or a computer associated with a particular person, having a predetermined role.

Figure 11:
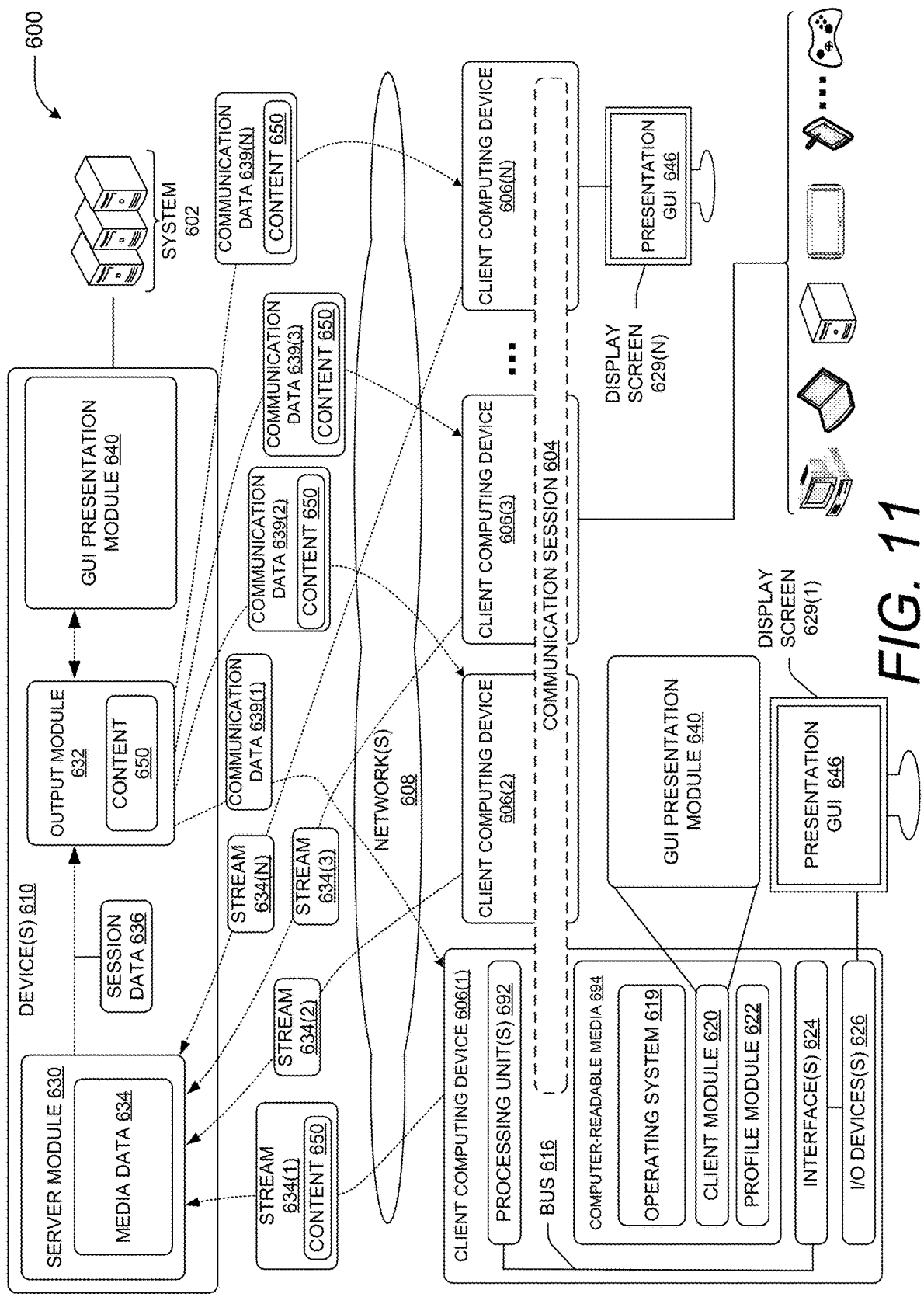
FIG. 11 is a diagram illustrating a distributed computing environment capable of implementing aspects of the techniques and technologies presented herein.

FIG. 11 is a diagram illustrating aspects of a routine 900 for controlling the communication of messages to a user having a predetermined role. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or 2 as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 11 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 900 includes an operation 902 where the system receives a selection of permitted users. In some embodiments, the selection of users can be based on identities associated with participants of a communication session. Users having identities associated with a particular domain can be determined as permitted users, while other identities associated with other domains can be determined as non-permitted users. Other factors, including an address, a geographic location, building, or other characteristics of a user can be used to determine if a user is permitted user or a non-permitted user. In some configurations, a user having appropriate permissions, such as a presenter, can provide a user input indicating a selection of specific people to be deemed as permitted users.

In operation 902, the system can generate permission data identifying permitted users that are allowed to communicate messages to a predetermined user having a particular role, such as a presenter. In some configurations, a presenter can be user having access to specific functions such as filesharing capabilities, application sharing capabilities, or other capabilities for allowing a user to direct share content to a plurality of users. The permission data can also identify non-permitted users based on the input data.

Next, at operation 904, the system receives a first set of messages from one or more permitted users. An example showing messages received from permitted users 120 is depicted in FIG. 2A. Next, at operation 906, the system causes a display of the messages received from the permitted users. As shown in FIG. 2A, the messages are displayed in a user interface 101A directed to the recipient, user 10A, such as a presenter. The messages are displayed in a manner such that only the presenter can view the messages. In some embodiments, the messages are displayed in a manner such that the presenter and other permitted users having appropriate permissions with the messages.

Next, at operation 908, the system receives messages from non-permitted users. At operation 910, the system can restrict the display of the messages received from a non-permitted users at the presenter's display screen. The system can also obscure, hide, or replace pixels of the messages to users other than the predetermined user, e.g., a presenter.

Figure 12:
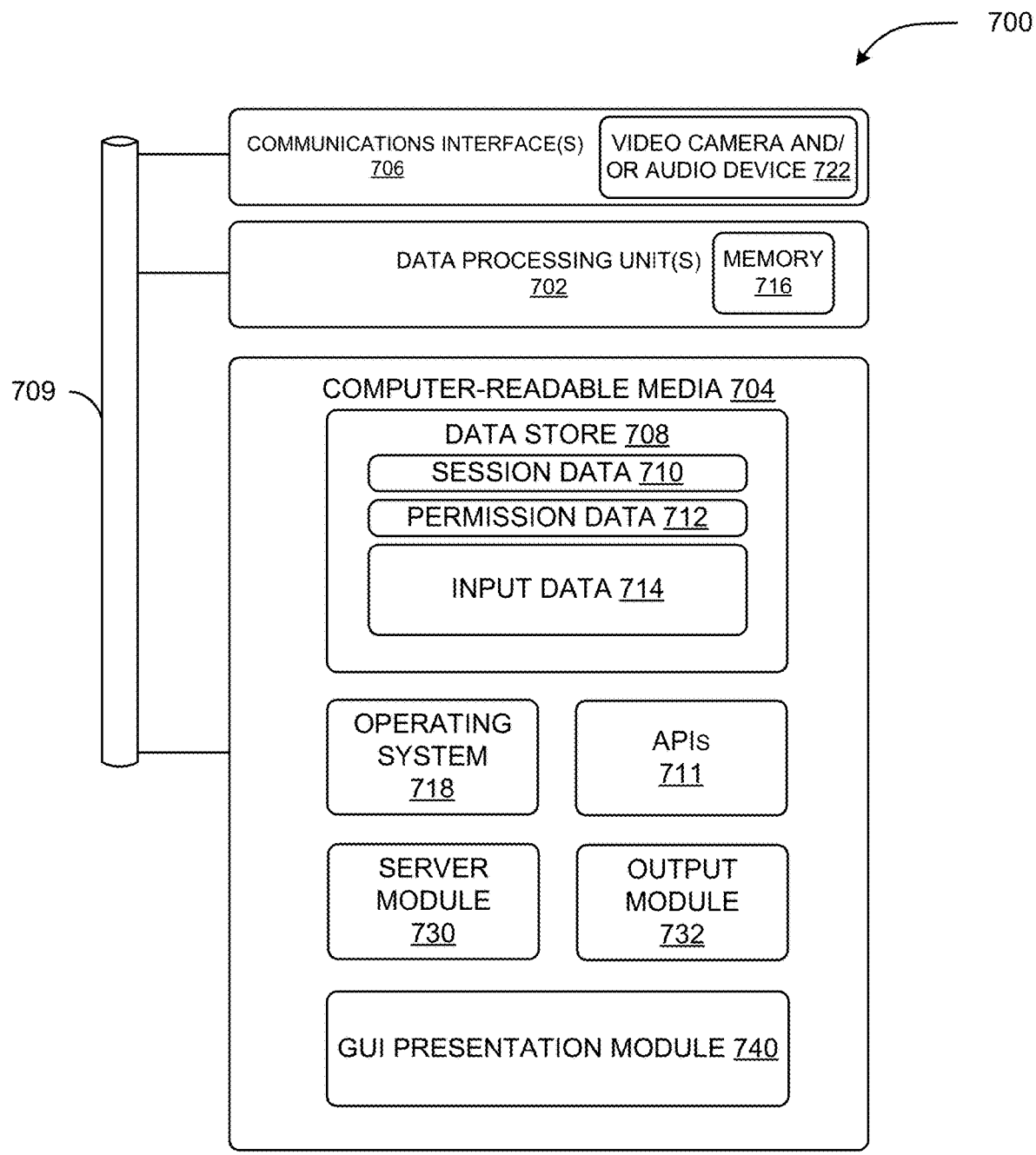
FIG. 12 is a computer architecture diagram illustrating a computing device architecture for a computing device capable of implementing aspects of the techniques and technologies presented herein.

FIG. 12 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. A communication session 604 can include a live stream broadcast, a meeting, a chat session, a multi-user editing session, or any other event having a start time and it end time where content is shared between two or more users. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data.

The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 11 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 606(1) is in some way connected to a display device (e.g., a display screen 629(N)), which can display a UI according to the techniques described herein.

In the example environment 600 of FIG. 11, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 11) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

FIG. 12 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF")

tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 11), permission data 712, and/or other data. The permission data 712 can associate individuals with permitted and restricted functionality. For instance, an individual identity may be associated with the ability to send a message to another individual. Such permissions can be also associated with a particular timeline or a portion of an event. For instance, a person may have a particular set of permissions for sending a message to another individual during a portion, such as a presentation, of an event. Other permissions may allow a particular individual, such as an audience member, to view messages sent from another audience member to a presenter. Such an example is provided herein and shown in FIG. 9.

The session data 710 can include a total number of participants (e.g., users and/or client computing devices) in a communication session, activity that occurs in the communication session, a list of invitees to the communication session, and/or other data related to when and how the communication session is conducted or hosted. Session data can define a start time and end time and event and also provide a start time and an end time for portions of an event, such as a presentation. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. The contextual data 714 can also include input data indicating a selection of users who are members of a system. This can include a selection of users who are in a communication session, e.g., an online meeting, and those who are not in a communication session.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 711 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The following clauses are to supplement the present disclosure.

Clause A: A method for controlling a communication of messages (150) to a presenter (10A) of a communication system (100), the method comprising: receiving input data indicating a selection of permitted users (10B-10F and 10L) from a plurality of users; configuring permission data for allowing the permitted users (10B-10F and 10L) to exclusively communicate individual messages (150) to a computing device associated with the presenter for display of the messages during a presentation (990); receiving the individual messages from the permitted users (10B-10F and 10L), wherein the individual messages (150) are directed to the presenter during the presentation (990); and causing a display of the individual messages on a user interface (101A) of the computing device associated with the presenter (10A) based on the permission data (712) identifying the permitted users (10B-10F and 10L) allowed to communicate the individual messages (150) to the presenter (10A) during the presentation (990), wherein the user interface (101A) is configured to display of the individual messages (150) received from the permitted users (10B-10F and 10L) to the presenter (10A) while restricting the display of the individual messages (150) to other users (10G-10K) of the plurality of users (10A-10L).

Clause B: The method of Clause A, wherein the individual messages are communicated to the computing device associated with the presenter, wherein the individual messages from the permitted users are only rendered on a display device in communication with the computing device, the rendering of the individual messages is configured to be displayed as an overlay over content controlled by the presenter, wherein the content is communicated for display on other computing devices associated with individual participants of a communication session from the computing device without communication of the individual messages.

Clause C: features feature where corresponding pixels are extracted/obscured/replaced in video streams to other attendees in the meeting. This approach of extracting or obscuring the messages may be needed if a presenter is using a large screen and an image of the large screen is captured by a camera and sent to other attendees, the method of Clauses A through B, wherein the individual messages are communicated to the computing device associated with the presenter, wherein the individual messages from the permitted users are rendered with presentation content on a display device in communication with the computing device, wherein an image of the display device is communicated for display on other computing devices associated with individual participants of a communication session, wherein the image is configured to extract, replace, or obscure pixels of the rendering of the individual messages.

Clause D: permissions are further configured to restrict non-permitted users from sending messages to the presenter, the method of Clauses A through C, wherein the permission data is further configured to restrict other users of the plurality of users from communicating other messages to the presenter during the presentation, wherein the method further comprises: receiving the other messages from the other users, wherein the other messages are directed to the presenter during the presentation; and restricting the other messages from being displayed on the user interface associated with the presenter during the presentation, wherein the restriction is based on the permission data identifying the other users that are restricted from communicating the individual messages to the presenter during the presentation.

Clause E: email or domain-based operations for selecting permitted users, an embodiment where permissions are based on the domain, people in the same domain are permitted, people outside the domain are not allowed to communicate messages to the presenter, the method of Clauses A through D, wherein the input data indicating the selection of the permitted users is based on an approved domain associated with identities of the permitted users, and wherein the other users that are restricted from communicating messages to the presenter are associated with other identities associated with a restricted domain.

Clause F: embodiments for selecting permitted users are based on roles of the users, users can be either attendees or non-attendees of a communication session, e.g., a meeting, the method of Clauses A through E, wherein the selection of the permitted users is based on the input data defining a first role associated with identities of the permitted users, and wherein the other users that are restricted from communicating messages to the presenter are associated with other identities associated with other roles.

Clause G: message can be displayed perpetually or for a limited time based on a characteristic of the message or a characteristic of the sender, the characteristic can include a level of relevancy of the message relative to the presentation content, a role of the sender, a priority of the sender, a domain, address, the method of Clauses A through F, wherein a duration of a display of an individual message of the individual messages on the user interface is based on at least one of a role of a permitted user sending the individual message, a level of relevancy of the individual message relative to presentation content, a domain associated with the permitted user sending the individual message, or a priority of the permitted user sending the individual message.

Clause H: the method of Clauses A through G, wherein a size or position of an individual message of the individual messages on the user interface is based on at least one of a role of a permitted user sending the individual message, a level of relevancy of the individual message relative to presentation content, a domain associated with the permitted user sending the individual message, or a priority of the permitted user sending the individual message.

Clause I: the method of Clauses A through H, wherein properties of a notification generated in association with an individual message of the individual messages on the user interface are based on at least one of a role of a permitted user sending the individual message, a level of relevancy of the individual message relative to presentation content, a domain associated with the permitted user sending the individual message, or a priority of the permitted user sending the individual message.

Clause J: the method of Clauses A through I, wherein the permission data is configured to allow one or more of the permitted users to view the individual messages that is displayed on the user interface of the computing device associated with the presenter, wherein the method further comprises, communicating image data for causing a display of presentation content with the individual messages on individual display devices associated with the one or more of the permitted users based on the permission data.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for controlling a communication of messages to a presenter of a communication system, the method comprising:
   receiving input data indicating a selection of permitted users from a plurality of users;
   configuring permission data for allowing the permitted users to exclusively communicate individual messages to a computing device associated with the presenter for display of the messages during a presentation;
   receiving the individual messages from the permitted users, wherein the individual messages are directed to the presenter during the presentation; and
   causing a display of the individual messages on a user interface of the computing device associated with the presenter based on the permission data identifying the permitted users and allowed to communicate the individual messages to the presenter during the presentation, wherein the user interface is configured to display of the individual messages received from the permitted users to the presenter while restricting the display of the individual messages to other users of the plurality of users.

2. The method of claim 1, wherein the individual messages are communicated to the computing device associated with the presenter, wherein the individual messages from the permitted users are only rendered on a display device in communication with the computing device, the rendering of the individual messages is configured to be displayed as an overlay over content controlled by the presenter, wherein the content is communicated for display on other computing devices associated with individual participants of a communication session from the computing device without communication of the individual messages.

3. The method of claim 1, wherein the individual messages are communicated to the computing device associated with the presenter, wherein the individual messages from the permitted users are rendered with presentation content on a display device in communication with the computing device, wherein an image of the display device is communicated for display on other computing devices associated with individual participants of a communication session, wherein the image is configured to extract, replace, or obscure pixels of the rendering of the individual messages.

4. The method of claim 1, wherein the permission data is further configured to restrict other users of the plurality of users from communicating other messages to the presenter during the presentation, wherein the method further comprises:
   receiving the other messages from the other users, wherein the other messages are directed to the presenter during the presentation; and
   restricting the other messages from being displayed on the user interface associated with the presenter during the presentation, wherein the restriction is based on the permission data identifying the other users that are restricted from communicating the individual messages to the presenter during the presentation.

5. The method of claim 1, wherein the input data indicating the selection of the permitted users is based on an approved domain associated with identities of the permitted users, and wherein the other users that are restricted from communicating messages to the presenter are associated with other identities associated with a restricted domain.

6. The method of claim 1, wherein the selection of the permitted users is based on the input data defining a first role associated with identities of the permitted users, and wherein the other users that are restricted from communicating messages to the presenter are associated with other identities associated with other roles.

7. The method of claim 1, wherein a duration of a display of an individual message of the individual messages on the user interface is based on at least one of a role of a permitted user sending the individual message, a level of relevancy of the individual message relative to presentation content, a domain associated with the permitted user sending the individual message, or a priority of the permitted user sending the individual message.

8. The method of claim 1, wherein a size or position of an individual message of the individual messages on the user interface is based on at least one of a role of a permitted user sending the individual message, a level of relevancy of the individual message relative to presentation content, a domain associated with the permitted user sending the individual message, or a priority of the permitted user sending the individual message.

9. The method of claim 1, wherein properties of a notification generated in association with an individual message of the individual messages on the user interface are based on at least one of a role of a permitted user sending the individual message, a level of relevancy of the individual message relative to presentation content, a domain associated with the permitted user sending the individual message, or a priority of the permitted user sending the individual message.

10. The method of claim 1, wherein the permission data is configured to allow one or more of the permitted users to view the individual messages that is displayed on the user interface of the computing device associated with the presenter, wherein the method further comprises, communicating image data for causing a display of presentation content with the individual messages on individual display devices associated with the one or more of the permitted users based on the permission data.

11. The method of claim 1, wherein the input is configured to cause the communication system to modify permission data to allow permitted users to communicate individual messages to the computing device associated with the presenter for display of the messages during a presentation, the input is further configured to modify permission data to restrict the other users from communicating individual messages to the computing device associated with the presenter for display of the messages during a presentation, wherein, in response to the input, the communication system further modifies the permission data to restrict the other users from communicating individual messages to the computing device associated with the presenter.

12. A system for controlling a communication of messages to a predetermined user, comprising:
one or more processing units; and
a computer-readable storage medium having encoded thereon computer-executable instructions to cause the one or more processing units to:
receive input data indicating a selection of permitted users from a plurality of users;
configure permission data for allowing the permitted users to exclusively communicate individual messages to a computing device associated with the predetermined user for display of the messages during at least a portion of a predetermined event;
receiving the individual messages from the permitted users, wherein the individual messages are directed to the predetermined user during the at least the portion of the predetermined event; and
causing a display of the individual messages on a user interface of the computing device associated with the predetermined user based on the permission data identifying the permitted users allowed to communicate the individual messages to the predetermined user during the predetermined event, wherein the user interface is configured to display of the individual messages received from the permitted users to the predetermined user while restricting the display of the individual messages to other users of the plurality of users.

13. The system of claim 12, wherein the permission data is configured to allow one or more of the permitted users to view the individual messages that is displayed on the user interface of the computing device associated with the predetermined user, wherein the method further comprises, communicating image data for causing a display of presentation content with the individual messages on individual display devices associated with the one or more of the permitted users based on the permission data.

14. The system of claim 12, wherein the selection of the permitted users is based on the input data defining a first role associated with identities of the permitted users, and wherein the other users that are restricted from communicating messages to the predetermined user are associated with other identities associated with other roles.

15. The system of claim 12, wherein a duration of a display of an individual message of the individual messages on the user interface is based on at least one of a role of a permitted user of the permitted users sending the individual message, a level of relevancy of the individual message relative to presentation content, a domain associated with the permitted user sending the individual message, or a priority of the permitted user sending the individual message.

16. The system of claim 12, wherein a size or position of an individual message of the individual messages on the user interface is based on at least one of a role of a permitted user sending the individual message, a level of relevancy of the individual message relative to presentation content, a domain associated with the permitted user sending the individual message, or a priority of the permitted user sending the individual message.

17. A computer-readable storage medium having encoded thereon computer-executable instructions to cause one or more processing units of a system for controlling a communication of messages to a predetermined user to:
receive input data indicating a selection of permitted users from a plurality of users;
configure permission data for allowing the permitted users to exclusively communicate individual messages to a computing device associated with the predetermined user for display of the messages during at least a portion of a predetermined event;
receiving the individual messages from the permitted users, wherein the individual messages are directed to the predetermined user during the at least the portion of the predetermined event; and
causing a display of the individual messages on a user interface of the computing device associated with the predetermined user based on the permission data identifying the permitted users allowed to communicate the individual messages to the predetermined user during the presentation, wherein the user interface is configured to display of the individual messages received from the permitted users to the predetermined user while restricting the display of the individual messages to other users of the plurality of users.

18. The computer-readable storage medium of claim 17, wherein the permission data is configured to allow one or more of the permitted users to view the individual messages that is displayed on the user interface of the computing device associated with the predetermined user, wherein the method further comprises, communicating image data for causing a display of presentation content with the individual messages on individual display devices associated with the one or more of the permitted users based on the permission data.

19. The computer-readable storage medium of claim 17, wherein a duration of a display of an individual message of the individual messages on the user interface is based on at least one of a role of a permitted user of the permitted users sending the individual message, a level of relevancy of the individual message relative to presentation content, a domain associated with the permitted user sending the individual message, or a priority of the permitted user sending the individual message.

20. The computer-readable storage medium of claim 17, wherein a size or position of an individual message of the individual messages on the user interface is based on at least one of a role of a permitted user sending the individual message, a level of relevancy of the individual message relative to presentation content, a domain associated with the permitted user sending the individual message, or a priority of the permitted user sending the individual message.

* * * * *